United States Patent
Maruo et al.

(10) Patent No.: US 6,584,236 B1
(45) Date of Patent: Jun. 24, 2003

(54) IMAGE PROCESSING APPARATUS AND METHOD FOR IMAGE PROCESSING

(75) Inventors: Kazuyuki Maruo, Tokyo (JP); Takahiro Yamaguchi, Tokyo (JP); Masayoshi Ichikawa, Tokyo (JP)

(73) Assignee: Advantest Corporation (JP)

( * ) Notice: Subject to any disclaimer, the term of this patent is extended or adjusted under 35 U.S.C. 154(b) by 0 days.

(21) Appl. No.: 09/413,818

(22) Filed: Oct. 7, 1999

(30) Foreign Application Priority Data

Oct. 7, 1998 (JP) .......................................... 10-285783
Nov. 11, 1998 (JP) .......................................... 10-321041

(51) Int. Cl.[7] ............................................... A06K 9/32
(52) U.S. Cl. ...................... 382/298; 382/289; 382/290; 250/559.06
(58) Field of Search ................................ 382/298, 290, 382/289; 250/559.06

(56) References Cited

U.S. PATENT DOCUMENTS

| 4,866,784 A | 9/1989 | Barski .......................... 382/46 |
|---|---|---|
| 5,668,898 A * | 9/1997 | Tatsuta ........................ 382/290 |
| 5,691,543 A * | 11/1997 | Ishizaka ................. 250/559.06 |

FOREIGN PATENT DOCUMENTS

DE 44 05 105 9/1994 ............. G06T/7/60

OTHER PUBLICATIONS

Duda et al., Pattern Classification and Scene Analysis, pp 267–272, 1973.
"Method for Automatically Detecting Angle Encoded Information", IBM Technical Disclosure Bulletin, vol. 31, No. 1, Jun. 1988, pp. 477–482.

* cited by examiner

Primary Examiner—Anh Hong Do
(74) Attorney, Agent, or Firm—Rosenthal & Osha L.L.P.

(57) ABSTRACT

An image processing apparatus for detecting the inclination of an object is provided. This image processing apparatus has a read means which reads the object and outputs image data, an amount of change calculation means which calculates the sum of the amounts of change of the image data of the object in at least one direction, and an inclination calculation means which calculates the inclination of the object based on the sum calculated by the amount of change calculation means.

42 Claims, 21 Drawing Sheets

(a)

(b)

(a)

(b)

(c)

LPF:LOW-PASS FILTER(SCALING FUNCTION)
HPF:HIGH-PASS FILTER(WAVELET FUNCTION)

(a)

(b)

(a)

(b)

(a)

(b)

(a)

(b)

(a)

(b)

(a)

(b)

(c)

(a)

(b)

(a)

(b)

IMAGE PROCESSING APPARATUS AND METHOD FOR IMAGE PROCESSING

This patent application claims priority based on a Japanese patent application, H10-321041 filed on Nov. 11, 1998, and H10-285783 filed on Oct. 7, 1998, the contents of which are incorporated herein by reference.

BACKGROUND OF THE INVENTION

1. Field of the Invention

The present invention relates to an image processing apparatus which recognizes the characteristics of a semiconductor wafer pattern image that is stored in a semiconductor wafer manufacturing process and the characteristics of the wire pattern image of a print substrate or the like.

2. Description of Related Art

In a manufacturing/inspection process of a print substrate or a semiconductor wafer, when a defect or a foreign object is generated on the surface of the substrate, the defect or foreign object is observed using a SEM (Scanning Electronic Microscope) or the like. The observation result is then stored as image data. Many of the stored images of defect have similar structures. When observing a wafer image, if one wishes to see similar images stored in the image file, the only available option is to search for similar images one after another through the image file based on one's memory. Moreover, the characteristics of the image data are difficult to represent using simple numerical values. Therefore, the characteristics of the image data are recognizable only to the person who has observed the image. Hence, it is not easy to share the image data with another person. There is an increasing demand for an image processing apparatus capable of searching for the image data of a semiconductor chip automatically and efficiently.

When a defective portion of a semiconductor chip is observed using a SEM or the like, it can be seen that a regular wire pattern is arranged in a prescribed direction, and an irregular pattern such as a foreign object and open/short patterns exists in the regular wire pattern. In order to analyze specific characteristics of the defect in detail, the observer rotates or magnifies or shrinks the image. If the background wire pattern containing the defect is rotated, the image processing apparatus cannot recognize that the rotated image is identical to the original image. Therefore, the image processing apparatus cannot search for the image data automatically. For this reason, the direction of the background wire pattern needs to be held constant, that is, the image needs to be standardized. The image can be standardized by specifying the direction of the given wire pattern, that is, the inclination of the wire pattern.

Conventionally, the inclination of the wire pattern of an image of a photograph of a print substrate or a semiconductor that has been photographed using a SEM or the like and input is specified primarily using a template matching technique.

FIG. 1 is a conceptual picture of a process for specifying the inclination of a wire pattern using a template matching technique. First, an edge detection process is performed for the original image as shown in FIG. 1(a) to create a binary image as shown in FIG. 1(b). An edge detection filter is an image processing device which detects positions at which the luminance of a gray scale image changes rapidly. For example, a Sobel operator or the like is used as an edge detection filter. The edge detection filter for gray scale images is explained in detail, for example, in Pattern Classification and Scene Analysis, by R. O. Duda and P. E. Hart, Wiley, 1971. The image shown in FIG. 1(b) obtained using the edge detection filter is converted into a binary image as follows. The edge portions of defective spots and the wire pattern are represented by pixel value 1. All the other portions of the image shown in FIG. 1(b) are represented by pixel value 0. Next, templates for comparing with the image in which edges have been detected are prepared.

FIGS. 1(c) and (d) show examples of template images. The template images are also binary images. In these images also, the pixel values of the straight lines in FIGS. 1(c) and (d) are 1 and the pixel values of all the other portions are 0. Straight line templates inclined in various directions are prepared to construct a correlation image of the edge detection image shown in FIG. 1(b). That is, the correlation image of the edge detection image shown in FIG. 1(b) is constructed by multiplying the pixel value of each pixel of the edge detection image with the pixel value of the corresponding pixel of the template image. As a result, only when both the pixel values of the pixels of the edge detection image and the pixel values of the pixels of the template image corresponding to the pixels of the edge detection image are non-zero, the pixel values of the corresponding pixels of the correlation image become non-zero. The pixel values of all the other pixels of the correlation image become zero.

As shown in FIG. 1(d), when a figure exists at the same position and same direction on the template image as in the edge detection image, many pixels having non-zero pixel values appear on the correlation image as shown in FIG. 1(f). Therefore, a threshold value is set to the number of pixels whose pixel values are non-zero on the correlation image. When the number of pixels whose pixel values are non-zero exceeds the threshold value, it is judged that the corresponding template figure exists. For example, eight straight lines having the same slope are detected from the image shown in FIG. 1(b). In a semiconductor wafer image, multiple straight lines having the same slope form a wire pattern. Therefore, the slope of the wire pattern can be specified by the above-described process.

Since the conventional template matching method uses an edge detection filter for a pre-process, the image of the wafer pattern as the object of observation needs to be clear. For example, as in the case of FIG. 2(a), if the edge portion of the wire pattern is unclear, the edge cannot be detected by the conventional edge detection filter as shown in FIG. 2(b). Even if the template matching process is performed on the image shown in FIG. 2(b), straight lines cannot be detected. Hence, the inclination of the wire pattern cannot be specified.

Moreover, the conventional template matching method is very time consuming. For example, the amount of operation required to detect an image having the image size of N pixels ×N pixels, the resolution for specifying the inclination of the wire pattern of 5° unit over the range between 0° and 180° will be shown in what follows. When a Sobel 3×3 operator and a threshold value process are used for the edge detection filter, both the multiplication and the addition require $3 \times 3 \times N^2$ steps, and the condition processing operation requires $N^2$ steps. Next, in the template matching process, (multiplication×$N^2$+addition×$N^2$+condition process)× (180÷5)×$N^2$ steps are required. In total, both the multiplication and the addition require $9N^2(1+4N^2)$ steps, and the condition processing operation requires $37N^2$ steps. Since the number of steps the multiplication and the addition require are proportional to the 4-th power of the image size N, the processing time increases rapidly as the image size is increased.

SUMMARY OF THE INVENTION

Given these problems, it is an object of the present invention to provide an image processing apparatus capable of specifying the inclination of an object of detection even from an unclear image whose edge cannot be detected by the conventional template matching method. It is also an object of the present invention to provide an image processing apparatus capable of specifying at high speed the inclination of an object of detection even from a large image which takes a long length of time for the conventional template matching method to process. These objectives are achieved by a combination of characteristics described in the independent claims of the present invention. Moreover, the dependent claims of the present invention determine further advantageous embodiments of the present invention.

To solve these problems, according to the first aspect of the invention, an image processing apparatus for detecting the inclination of an object is provided. This image processing apparatus has a read means which reads the object and outputs image data, an amount of change calculation means which calculates the sum of the amounts of change of the image data of the object in at least one direction, and an inclination calculation means which calculates the inclination of the object based on the sum calculated by the amount of change calculation means.

According to the second aspect of the invention, another image processing apparatus as described in the first aspect of the invention is provided. The amount of change calculation means of this image processing apparatus has a means which calculates differences between pixel values of a plurality of pixels in the one direction at a plurality of locations in the image data, and sums up the differences between the pixel values of the plurality of pixels to calculate the sum calculated in at least the one direction. Moreover, when the number of pixels of the image data, the difference between the pixel values, and the sum are represented by N, I, and $E_{LH}$, respectively, the inclination calculation means calculates the inclination substantially based on the equations $$\theta=\arctan(4/3-(8NE_{LH})/(3I^2)), 0°\leq\theta\leq45°$$

$$\theta=\arctan(I^2/8NE_{LH}), 45°\leq\theta\leq90°.$$

According to the third aspect of the invention, further another image processing apparatus as described in the first aspect of the invention is provided. The amount of change calculation means of this image processing apparatus has a means which calculates the sum calculated in a first direction in the object and the sum calculated in a second direction that is perpendicular to the first direction in the object. Moreover, the inclination calculation means has a means which calculates the inclination of the object using the ratio between the sum calculated in the first direction and the sum calculated in the second direction.

According to the fourth aspect of the invention, further another image processing apparatus as described in the third aspect of the invention is provided. The amount of change calculation means of this image processing apparatus calculates differences between pixel values of a plurality of pixels in at least the one direction at a plurality of locations in the image data, and sums up the differences between the pixel values of the plurality of pixels to calculate the sum calculated in at least the one direction. Moreover, when the number of pixels of the image data, the amount of change of the image data between two pixels of the image data, the sum calculated in the first direction, and the sum calculated in the second direction are represented by N, I, $E_{HL}$, and $E_{LH}$, respectively, the inclination calculation means calculates the inclination substantially based on the equations $$R'=E_{LH}/(E_{HL}+E_{LH})$$

$$\theta=\arctan((4-4R')/(3-2R')), 0°\leq\theta\leq45°$$

$$\theta=\arctan((2R'+1)/4R'), 45°\leq\theta\leq90°.$$

According to the fifth aspect of the invention, further another image processing apparatus as described in the first aspect of the invention is provided. The inclination calculation means of this image processing apparatus has a modification means which modifies the image data and creates a modified image that corresponds to the image data when the object is rotated, and a repetition means which calculates the amount of change using the amount of change calculation means while having the modification means modify the image. In this case, the inclination calculation means calculates the inclination of the object based on the amount of modification of the image data modified by the modification means when the amount of change satisfies a prescribed condition.

According to the sixth aspect of the invention, further another image processing apparatus as described in the fifth aspect of the invention is provided. In this case, the modified image is a rotated image of the image data.

According to the seventh aspect of the invention, further another image processing apparatus as described in the fifth aspect of the invention is provided. In this case, the modified image is an image obtained by reducing the image data in at least the one direction.

According to the eighth aspect of the invention, further another image processing apparatus as described in the fifth aspect of the invention is provided. In this case, the inclination calculation means of this image processing apparatus detects the inclination of the object based on the amount of modification of the image data at which the amount of change in at least the one direction is maximized.

According to the ninth aspect of the invention, further another image processing apparatus as described in the fifth aspect of the invention is provided. In this case, the inclination calculation means of this image processing apparatus detects the inclination of the object based on the amount of modification of the image data at which the amount of change in at least the one direction is minimized.

According to the tenth aspect of the invention, further another image processing apparatus as described in the fifth aspect of the invention is provided. In this case, the amount of change calculation means of this image processing apparatus has a wavelet transform means which wavelet-transforms the image data, an energy calculation means which calculates the energy of a high frequency component of the image data contained in the wavelet-transformed image data, and an output means which outputs the energy as a value that represents the amount of change.

According to the eleventh aspect of the invention, further another image processing apparatus as described in the fifth aspect of the invention is provided. In this case, the amount of change calculation means of this image processing apparatus has a first transform means which wavelet-transforms the image data in a first direction of the object, a second transform means which wavelet-transforms in a second direction distinct from the first direction an image element that represents a high frequency component of the image data wavelet-transformed by the first transform means, a second-stage energy calculation means which calculates the energy of a high frequency component of the image data wavelet-transformed by the second transform means, and a second-stage output means which outputs the energy as a value that represents the sum calculated in a central direction of the two directions.

According to the twelfth aspect of the invention, further another image processing apparatus as described in the fifth aspect of the invention is provided. In this case, the inclination calculation means of this image processing apparatus obtains a plurality of amounts of modification for the image data when the amount of change satisfies a prescribed condition. Moreover, the inclination calculation means further has an interpolation means which interpolates the plurality of amounts of modification for the image data to obtain an interpolated value and calculates the inclination of the object based on the interpolated value.

According to the thirteenth aspect of the invention, further another image processing apparatus as described in the twelfth aspect of the invention is provided. In this case, the interpolation means calculates the inclination of the object based on the plurality of amounts of modification and the sum calculated for each of the plurality of amounts of modification.

According to the fourteenth aspect of the invention, further another image processing apparatus as described in the fifth aspect of the invention is provided. In this case, the amount of change calculation means of this image processing apparatus has a shift means which shifts the image data by one bit in a direction in which the image data is to be wavelet-transformed, a first wavelet transform means which wavelet-transforms the image data before the image data is shifted by one bit, a second wavelet transform means which wavelet-transforms the image data after the image data is shifted by one bit, a third-stage energy calculation means which calculates the energy of a high frequency component of the image data wavelet-transformed by the first and second wavelet transform means, and a third-stage output means which outputs the energy as a value that represents the sum.

According to the fifteenth aspect of the invention, further another image processing apparatus as described in the tenth aspect of the invention is provided. In this case, the wavelet transform performed by the wavelet transform means is a Haar wavelet transform.

According to the sixteenth aspect of the invention, further another image processing apparatus as described in the tenth aspect of the invention is provided. In this case, the wavelet transform performed by the wavelet transform means is an overlapped sampling wavelet transform which detects all the amounts of change of the image data in a direction in which the wavelet transform is applied.

According to the seventeenth aspect of the invention, further another image processing apparatus as described in the fifth aspect of the invention is provided. This image processing apparatus further has a noise removal means for removing a noise from the image data.

According to the eighteenth aspect of the invention, further another image processing apparatus as described in the fifth aspect of the invention is provided. This image processing apparatus further has an image reduction means which pre-reduces the image data by ½.

According to the nineteenth aspect of the invention, further another image processing apparatus as described in the fifth aspect of the invention is provided. The amount of change calculation means of this image processing apparatus has a means for calculating the sum in a first and second directions of the object. Moreover, the inclination calculation means of this image processing apparatus detects the inclination of the object based on the amounts of change of the image data in the first and second directions.

According to the twentieth aspect of the invention, further another image processing apparatus as described in the nineteenth aspect of the invention is provided. The inclination calculation means of this image processing apparatus detects the inclination of the object based on the amount of modification for the image data obtained by the modification means when the sum calculated in at least one of the first and second directions satisfies a first condition and the amount of modification for the image data obtained by the modification means when the sum calculated in at least the other of the first and second directions satisfies a second condition.

According to the 21st aspect of the invention, further another image processing apparatus as described in the nineteenth aspect of the invention is provided. This image processing apparatus is characterized in that the first direction is substantially perpendicular to the second direction.

According to the 22nd aspect of the invention, further another image processing apparatus as described in the 21st aspect of the invention is provided. This image processing apparatus is characterized as follows. The first condition is that one of the two amounts of change of the image data achieves a minimum, and the second condition is that the other of the two amounts of change of said image data achieves a maximum.

According to the 23rd aspect of the invention, further another image processing apparatus as described in the 21st aspect of the invention is provided. The amount of change calculation means of this image processing apparatus further has a means for calculating the sum calculated in a central direction of the two directions. This image processing apparatus is characterized as follows. The first condition is that the difference between the two amounts of change of the image data achieves a minimum. The second condition is that the sum calculated in the central direction achieves a maximum.

According to the 24th aspect of the invention, further another image processing apparatus as described in the 21st aspect of the invention is provided. The amount of-change calculation means of this image processing apparatus further has a means for calculating the sum calculated in a central direction of said two directions. This image processing apparatus is characterized as follows. The first condition is that the sum calculated in at least one of the two directions achieves a local minimum. The second condition is that the sum calculated in the central direction achieves a minimum.

According to the 25th aspect of the invention, further another image processing apparatus as described in the nineteenth aspect of the invention is provided. The amount of change calculation means of this image processing apparatus detects the inclination of the object based on the amount of modification for the image data when the sum calculated in the first direction becomes substantially equal to the sum calculated in the second direction.

According to the 26th aspect of the invention, further another image processing apparatus as described in the 25th aspect of the invention is provided. The amount of change calculation means of this image processing apparatus further has a means for calculating the sum in a central direction of the two directions. Moreover, the inclination calculation means of this image processing apparatus has a means for detecting the inclination of the object based on the inclination of the object at which the sum calculated in the first direction becomes substantially equal to the sum calculated in the second direction and the inclination of the object at which the sum calculated in the central direction becomes maximum.

According to the 27th aspect of the invention, further another image processing apparatus as described in the nineteenth aspect of the invention is provided. The amount of change calculation means of this image processing apparatus has a two-direction wavelet transform means which wavelet-transforms the image data in the first and second directions, a high-frequency component energy calculation means which calculates the energy of a high frequency component of the image data contained in the image data wavelet-transformed in the first direction by the two-direction wavelet transform means and the energy of a high frequency component of the image data contained in the image data wavelet-transformed in the second direction by the two-direction wavelet transform means, and an amount of change output means which outputs the two energies as values that represent the sum calculated in the first direction and the sum calculated in the second direction.

The above-described summary of the present invention does not list all the essential characteristics of the present invention. Sub-combinations of these characteristics are also covered by the scope of the present invention.

DETAILED DESCRIPTION OF THE INVENTION

In what follows, the present invention will be explained with embodiments of the present invention. However, the following embodiments do not restrict the scope of the invention described in the claims. Moreover, not all the combinations of the characteristics of the present invention described in the embodiments are essential to the problem solving means by the present invention.

1. Embodiment 1

Figure 1:
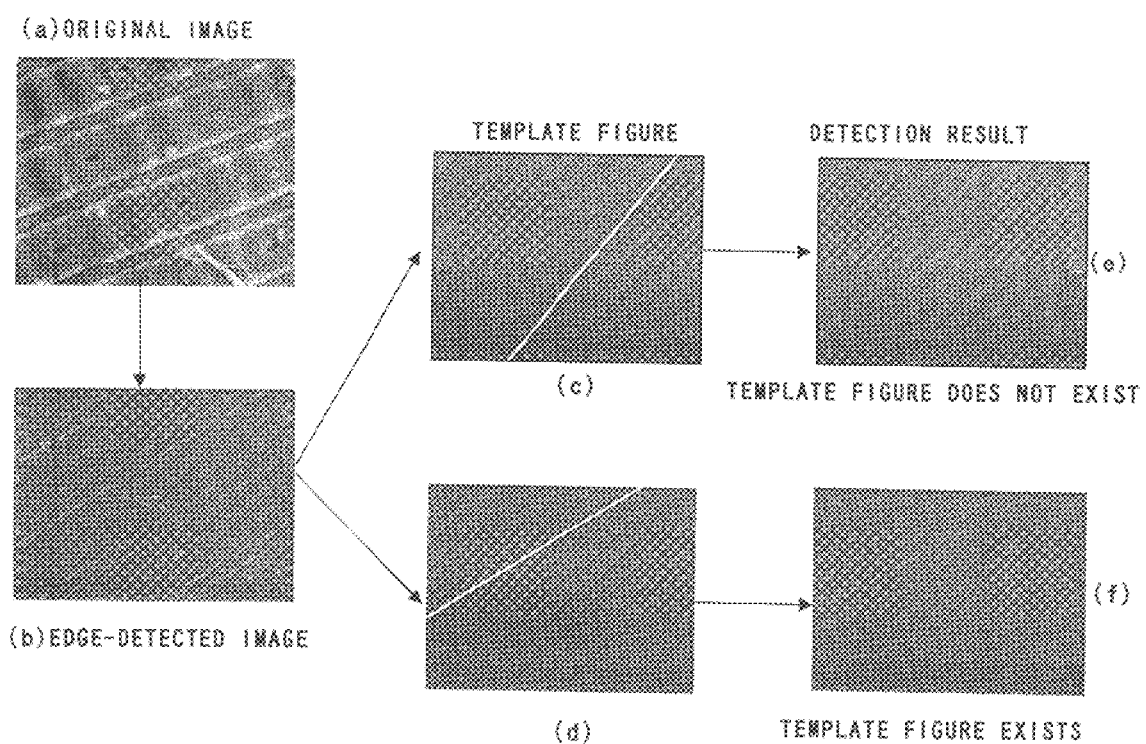
FIG. 1 is a conceptual picture explaining the conventional method for detecting the inclination of an object of inspection using the template matching method.
Figure 2:
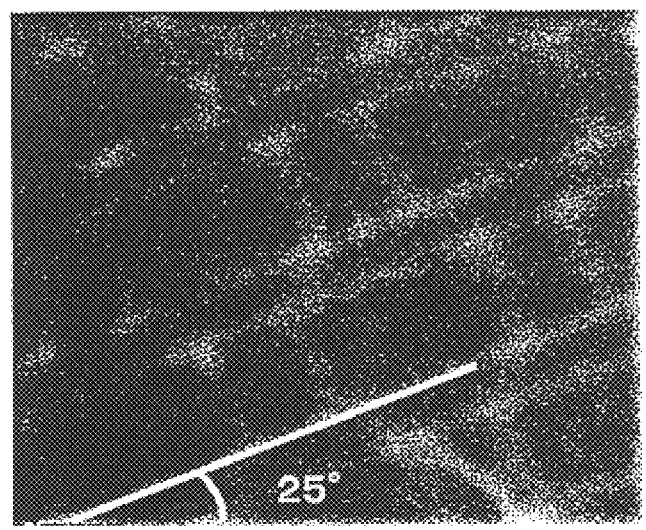
FIG. 2(a) is the original image whose inclination is to be detected.
FIG. 2(b) shows a result of applying an edge detection filter to the original image.
Figure 2:
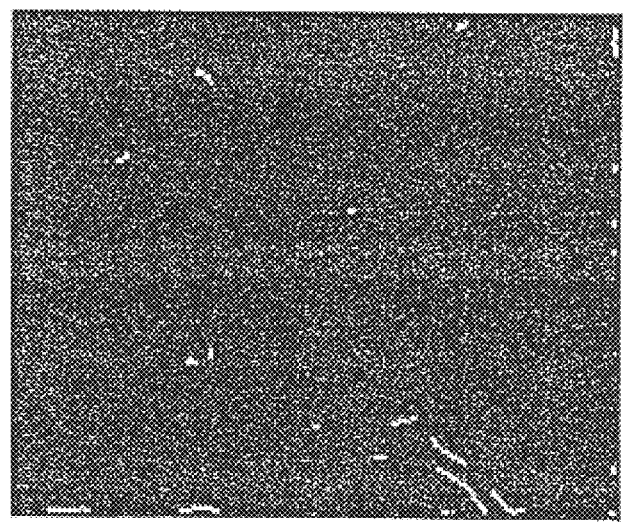
Figure 3:
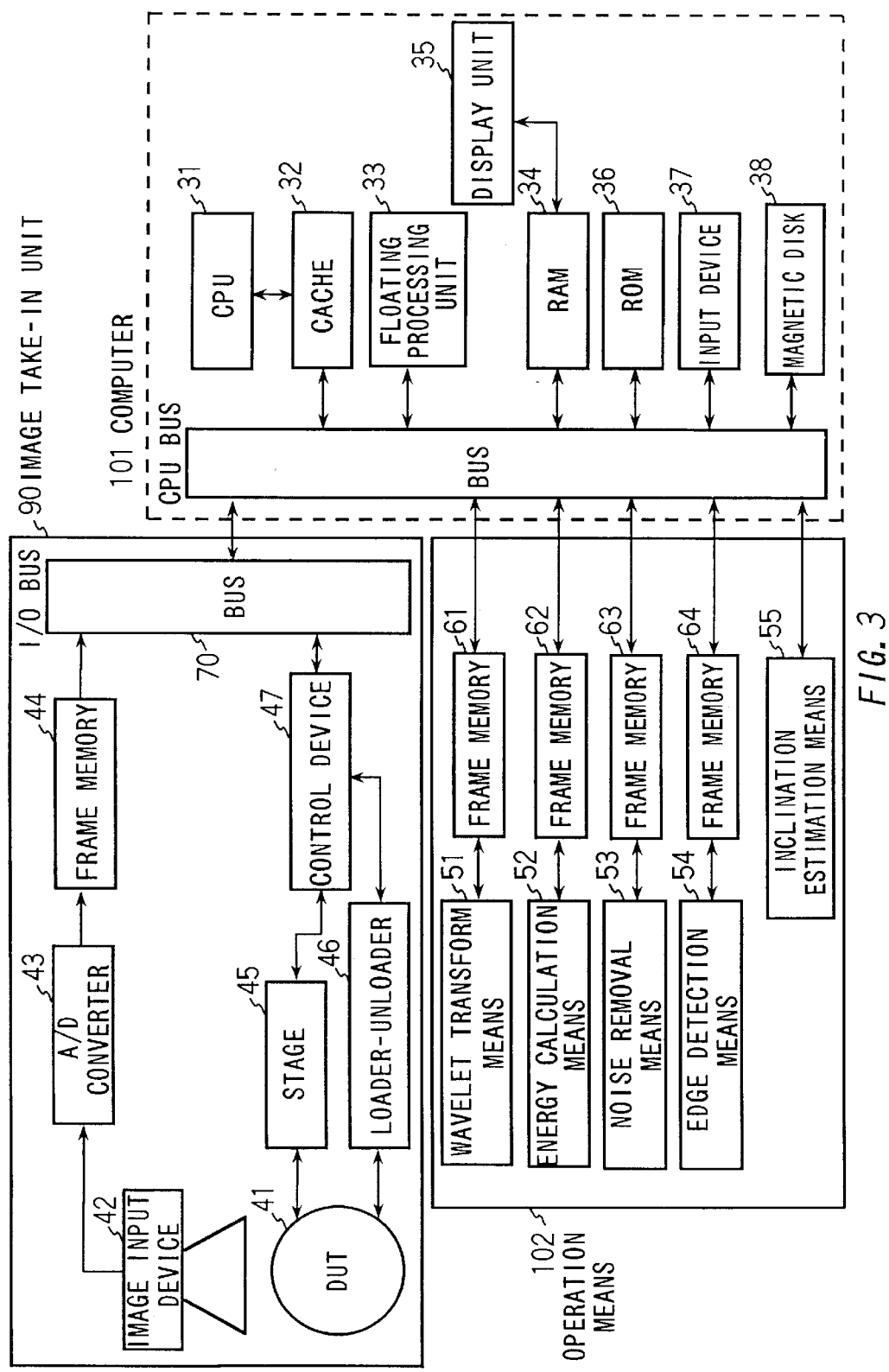
FIG. 3 shows the configuration of an image processing apparatus according to the present invention.

FIG. 3 shows the configuration of an image processing apparatus according to the present invention. This image processing apparatus has an image take-in unit 90, a computer 101, and an operation means 102. The computer 101 has a CPU 31 which performs input-output operations and calculations of various types, a cache 32 which holds commands or data that are used frequently and speeds up operations, a floating decimal point operation-unit 33, a RAM 34 and a ROM 36 which store user inputs and data, a display unit 35 which displays user selection menus and calculation results, a pointing device (input device) 37, including a mouse and a keyboard, for inputting parameters and commands, and a magnetic disk 38 for storing calculation results and the like.

The operation means 102 has a noise removal means 53 which removes noise from the object image, an edge detection means 54 which detects the edge of the object image, a wavelet transform means 51 which wavelet-transforms the image, an energy calculation means 52 which calculates the energy of each element of the wavelet-transformed image, and an inclination estimation means 55 which estimates the inclination of the object image. The operation means 102 also has a frame memories that are assigned to the noise removal means 53, edge detection means 54, wavelet transform means 51, and energy calculation means 52, respectively.

In the image take-in unit 90, the DUT 41 such as a semiconductor wafer or the like that is to become an object of inspection is loaded to and unloaded from the stage 45 by the loader-unloader 46 controlled by the control unit 47. The image of the loaded DUT 41 is input as image information by the image input device 42 such as an electron microscope or a CCD camera. The A/D converter 43 then converts the input image information of the loaded DUT 41 into digital data. The digital data is then stored in the frame memory 44 or is transferred to the RAM 34 in the computer via the I/O bus 70. Here, the wire pattern installed on the object is the object of inspection.

Figure 4:
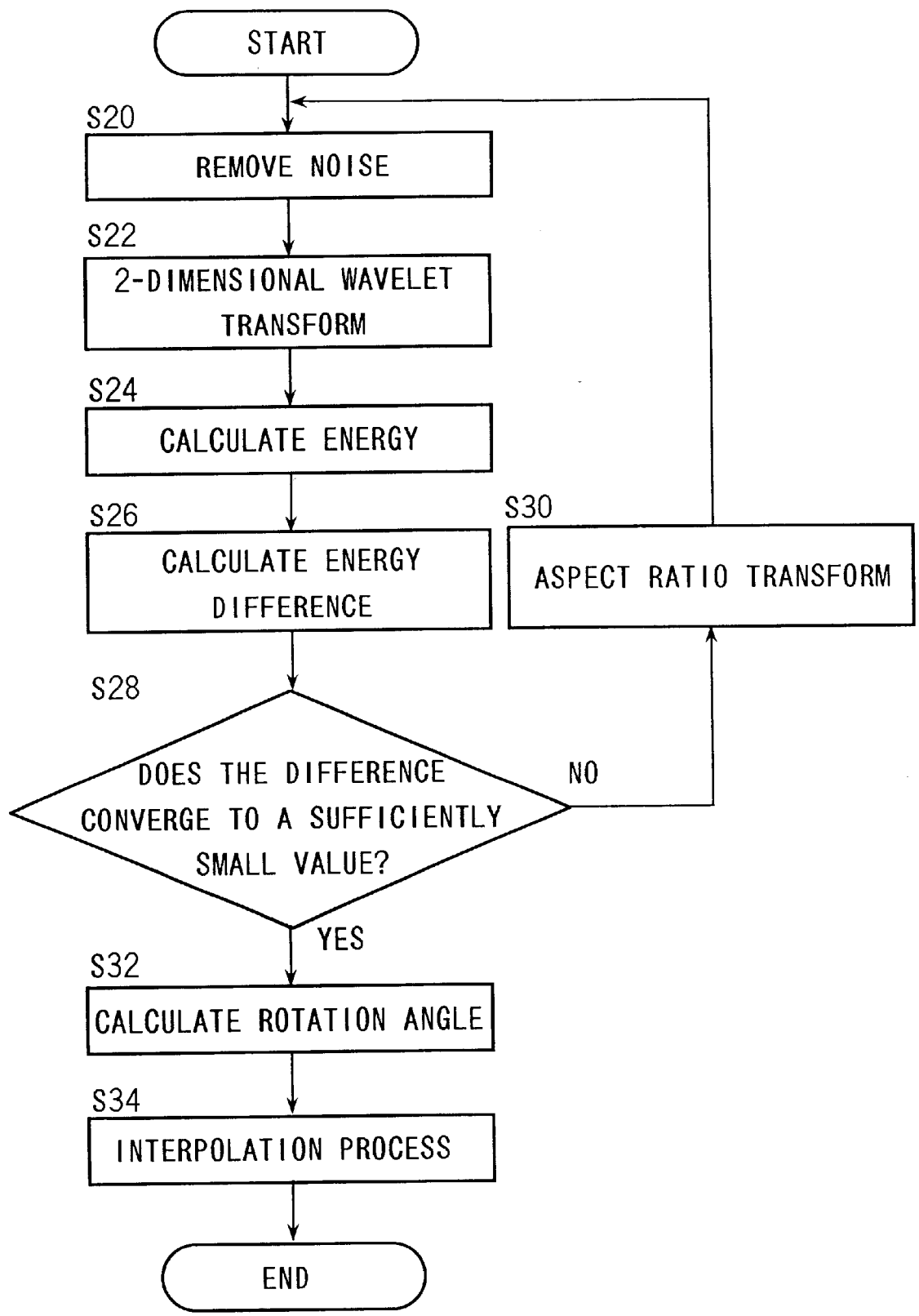
FIG. 4 shows the operation of the image processing apparatus according to the present invention.

FIG. 4 shows the flow chart of the image processing performed by the CPU 31. In the present embodiment, first, the noise removal means 53 removes noise from the input image by a median filter process (S20). The wavelet transform means 51 then applies a 2-dimensional wavelet transform to the image (S22). In order to remove the noise on the object image, for example, the pixel value of each pixel of the image may be replace with the median of the five pixel values of the pixel and the four pixels adjacent to the pixel. Next, the energy calculation means 52 calculates the energy of the wavelet-transformed image (S24) and the energy difference between two pixels of the wavelet-transformed image (S26).

The aspect ratio of the image is gradually transformed until this energy difference becomes sufficiently small (S28), and the object image is sequentially transformed (S30). The energy of the wavelet-transformed image changes as a function of the inclination of the object of inspection within the input image. Hence, based on the aspect ratio transform ratio of the image that is achieved when the energy of each pixel of the wavelet-transformed image satisfies a prescribed condition, the inclination estimation means 55 specifies the inclination of the object image (S32).

In order to calculate the inclination of the object image with a higher degree of accuracy, the energy of each pixel is calculated for a plurality of aspect ratio transformation ratios (S32). The inclination of the object image can be calculated with a higher degree of accuracy by interpolating the inclinations of the object image that are calculated for the plurality of aspect ratio transformation ratios (S34). In what follows, the content of the process in each step will be explained in detail.

A. Wavelet Transform Means (S22)

Wavelet transforms are explained in detail in "An Introduction to Wavelets" by Chui, Academic Press 1992. Therefore, wavelet transform processes will be briefly explained here. First, a 1-dimensional wavelet transform will be explained. There are many basis functions that can be used for a wavelet transform. Here, the Haar wavelet basis functions will be used. The basis function of the Haar wavelet has the shortest filter length among all the basis functions. The other wavelet basis functions differ from the Haar wavelet basis functions only in their forms, but they output approximately the same information as the Haar wavelet basis functions. A wavelet transform is composed of a scaling function and a wavelet function orthogonal to the scaling function. The scaling function outputs the smooth information of the data (low pass information), and the wavelet function outputs the detail information of the data (high pass information).

In the case of the Harr wavelet, the scaling function is $g0=g1=\frac{1}{2}$, and the wavelet function is $h0=h1=\frac{1}{2}$. The result X(N) of applying the Haar wavelet transform to an input signal x(n) ($0 \leq n \leq 15$; n is an integer) can be represented as follows.

$$X(0)=g0 \cdot x(0)+g1 \cdot x(1) X(8)=h0 \cdot x(0)+h1 \cdot x(1)$$

$$X(1)=g0 \cdot x(2)+g1 \cdot x(3) X(9)=h0 \cdot x(2)+h1 \cdot x(3)$$

$$X(2)=g0 \cdot x(4)+g1 \cdot x(5) X(10)=h0 \cdot x(4)+h1 \cdot x(5)$$

$$X(7)=g0 \cdot x(14)+g1 \cdot x(15) X(15)=h0 \cdot x(14)+h1 \cdot x(15)$$

The following input function x(n) is supplied to this Haar wavelet transform.

$$x(n)=\{0,0,0,0,0,0,0,2,2,2,2,2,2,2,2,2\} \quad (1)$$

↑edge

This signal changes only at one location. The location at which the signal changes is called an edge. As in the case of (1), an edge at which the value of the signal increases is called a rising edge. On the other hand, an edge at which the value of the signal decreases is called a falling edge. By applying the Haar wavelet transform to the signal (1), the following result X(N) is obtained.

$$X(N)=\{0,0,0,1,2,2,2,2|0,0,0,-1,0,0,0,0\} \quad (2)$$

wavelet function scaling function (high pass component) (low pass component)

The result of a wavelet transform is called a wavelet coefficient. The edge of the input signal s is detected in the wavelet coefficient X(11) of the high pass component. In this way, the edge component of the input signal can be detected by the wavelet transform. This wavelet transform can be applied to 2-dimensional image data such as a SEM image of a wafer pattern.

Figure 5:
FIG. 5 shows a specific example in which a wavelet transform is applied to the original image data.
Figure 5:
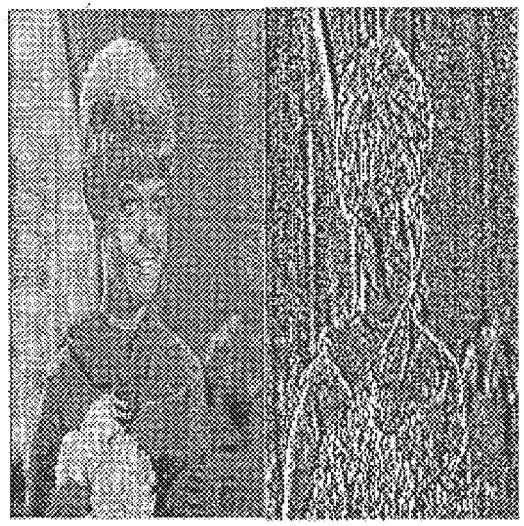
Figure 5:
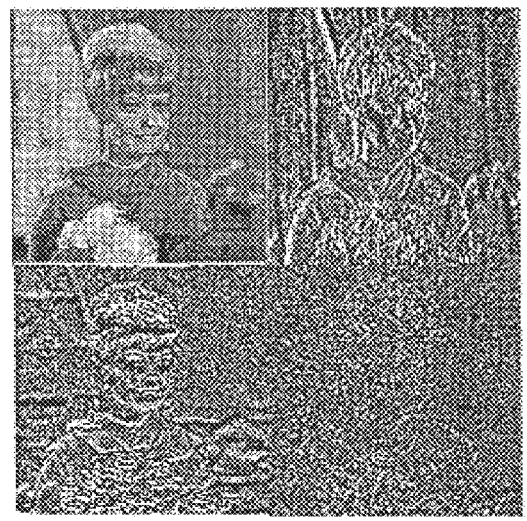

FIG. 5 shows a specific example in which a wavelet transform is applied to original image data. The original image shown in FIG. 5(a) is 512×512 digital data. First, a 1-dimensional wavelet transform is applied to this image in the x-axis direction. That is, the wavelet transform applied to a set of 512 signals in the x-axis direction is repeated 512 times in the y-axis direction. As a result, the image shown in FIG. 5(b) is obtained. The original image shown in FIG. 5(a) is stored as the low pass information (L) in the left half of the image shown in FIG. 5(b), and the high pass information is stored in the right half of the image shown in FIG. 5(b). Next, the same wavelet transform is applied in the y-direction to the image shown in FIG. 5(b).

As a result, the image shown in FIG. 5(c) is obtained. The upper half of the image shown in FIG. 5(c) stores the image shown in FIG. 5(b) as the low pass information (L), and the lower half of the image shown in FIG. 5(c) stores the high pass information (H). Therefore, the original image FIG. 5(a) is stored in the upper left quarter of FIG. 5(c) as the low pass information in both the x axis and y-axis directions (LL component). The combination of the x-axis direction high pass information and the y-direction low pass information (HL component) is stored in the upper right quarter of FIG. 5(c). The combination of the x-axis direction low pass information and the y-direction high pass information (LH component) is stored in the lower left quarter of FIG. 5(c). The combination of the x-axis direction high pass information and the y-direction high pass information (HH component) is stored in the lower right quarter of FIG. 5(c).

Figure 6:
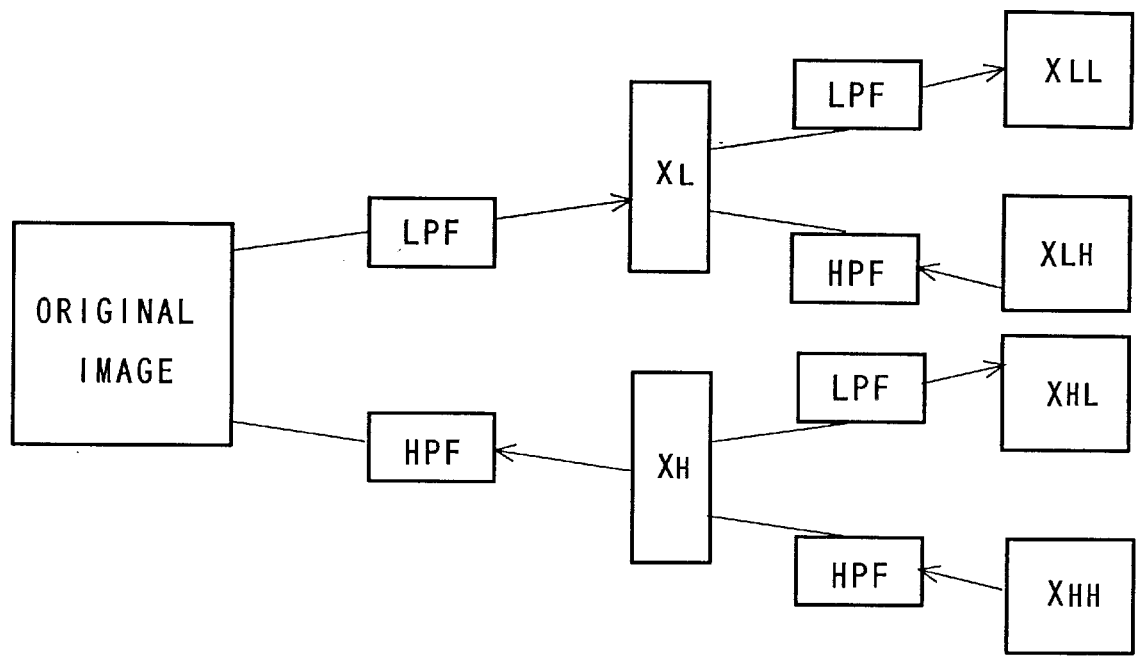
FIG. 6 shows a process conceptual diagram of a 2-dimensional wavelet transform.

FIG. 6 shows a process conceptual diagram of a 2-dimensional wavelet transform. The high pass filter (HPF) of the wavelet transform function calculates a local amount of change in pixel values. The low pass filter (LPF) outputs an image of ½ size by outputting the average of two pixels values as the value of one pixel. The high pass filter is applied vertically to the LH component of the image obtained by applying the wavelet transform to two orthogonal directions X and Y. Hence, this region detects a change in the pixel value in the vertical direction, that is, the horizontal edge component.

In the 2-dimensional wavelet transform, the LH component detects the horizontal edge (called horizontal line component), and the HL component detects the vertical edge (called vertical line component). Moreover, the HH component, to which the high pass filter has been applied in both the X and Y directions, detects edges in the central direction of the directions to which the first and second wavelet transform were applied, that is, edges in the 45° direction (called the oblique line component) in this example. The image obtained by applying the wavelet transform in the y-axis direction after applying the wavelet transform in the x-axis direction is identical with the image obtained by applying the wavelet transform in the x-axis direction after applying the wavelet transform in the y-axis direction.

Figure 7:
FIG. 7 shows the result of applying the 2-dimensional wavelet transform several times to the original image.
Figure 7:
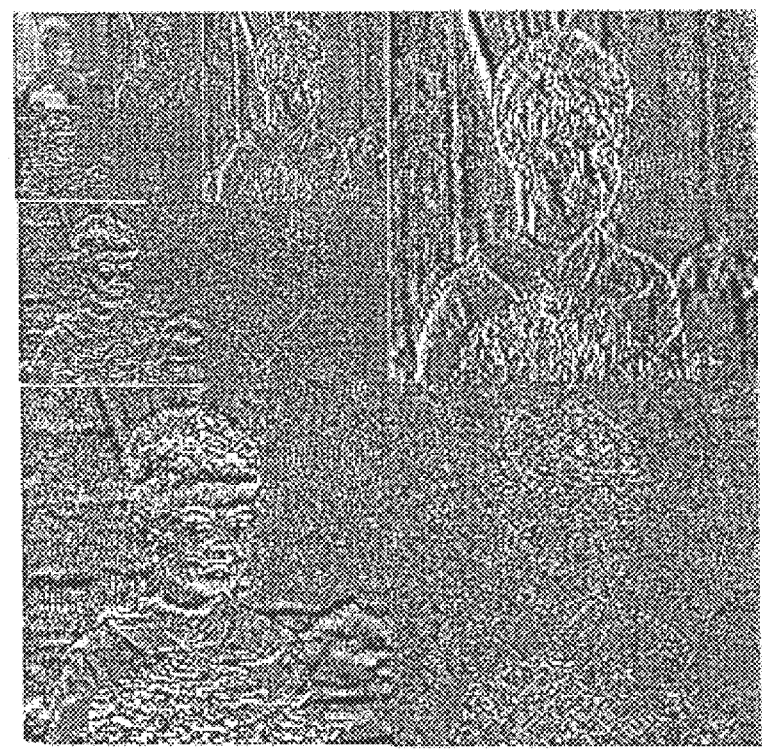

FIG. 7 shows the result of applying the 2-dimensional wavelet transform several times to the original image. The LL component obtained by applying the 2-dimensional wavelet transform is a low pass component whose screen size is ¼ of that of the original image. By applying the wavelet transform once more to this reduced image, the image shown in FIG. 7(a) can be obtained. As a result of the second wavelet transform, the LL component is further divided into four parts, and the resultant image becomes 1/16 the size of the original image. By applying the wavelet transform once more to this image reduced to 1/16 of the original image, the image shown in FIG. 7(b) can be obtained. As a result of the third wavelet transform, the LL component is further divided into four parts, and the resultant image becomes 1/64 the size of the original image. By repeatedly applying the wavelet transform, the resolution of the obtained image is reduced. This process is called multiple resolution analysis.

B. Energy Calculation (S24)

By applying a 2-dimensional wavelet transform to an image, a vertical line detection component, a horizontal line detection component, and an oblique line detection component can be obtained. When the object of detection is, for example, a wire pattern of a semiconductor or the like, multiple straight lines exist in the same direction. For example, if a 2-dimensional wavelet transform is applied to an image having a wire pattern that is aligned vertically, the edge component is detected in the HL component for detecting vertical lines but not in the LH component for detecting horizontal lines. On the other hand, if the 2-dimensional wavelet transform is applied to an image having wire patterns that are aligned horizontally, the edge component is detected in the LH component for detecting horizontal lines but not in the HL component for detecting vertical lines. Thus, the edge component detected by the LH, HL, and HH components, respectively, changes depending on the direction of the object of detection. Therefore, by quantifying "to what degree the edge is detected", the direction of the object of detection can be specified.

In order to quantify the degree to which the edge is detected, the energy amount E of each component of the wavelet transform is defined. Denoting each wavelet of the result of the 2-dimensional wavelet transform, the number of wavelet coefficients in the x-direction, and the number of wavelet coefficients in the y-direction by X(m, n), M, and N, respectively, the energy E can be expressed by the following equation.

$$E=(1/MN)\Sigma_{m=1}^{M}\Sigma_{n=1}^{N}X(m,n)^2 \tag{3}$$

Figure 8:
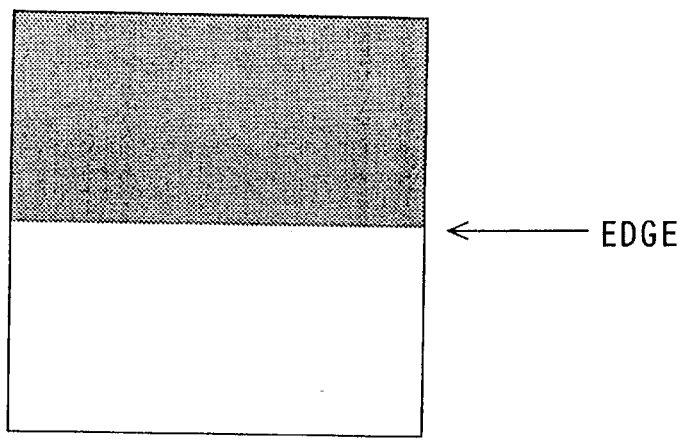
FIG. 8(a) is an original image having one edge.
FIG. 8(b) is an image obtained by applying a 2-dimensional wavelet transform to the image shown in (a).
Figure 8:
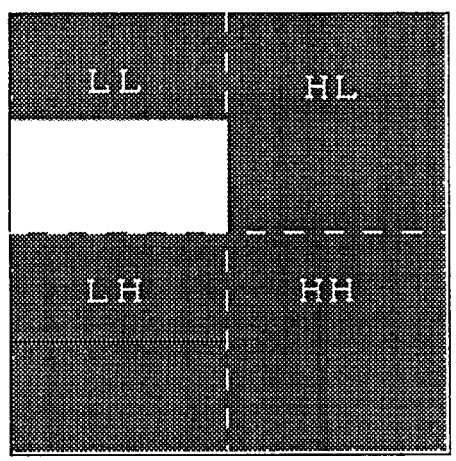

FIG. 8(a) shows an image having N×N pixels in total such that the pixel values in the upper half is 0 and the pixel values in the lower half is 1. Using FIG. 8(a), the relation between the inclination of the object of detection and the energy of the wavelet transform will be expressed by an equation. The straight line boundary on which the pixel value changes, that is, the edge is the object of detection. By applying the 2-dimensional wavelet transform to the edge, the result shown in FIG. 8(b) is obtained. The edge component is detected only in the LH component. The value of the wavelet coefficient that has detected the edge is ½(0−I)=−I/2. Since the number of wavelet coefficients is N/2×N/2, equation (3) yields that the energy of the LH component is $$E=(1/(N/2)^2)(-I/2)^2(N/2)=I^2/(2N). \tag{4}$$

The energy of the HL component and the energy of the HH component are both 0.

FIG. 9(a) shows an image obtained by rotating the image shown in FIG. 8(a) by a small angle θ. FIG. 9(b) is an image obtained by applying the 2-dimensional wavelet transform to the image shown in FIG. 9(a). Since the size of the image is N×N pixels, as shown in FIG. 9(a), the right end of the bottom boundary straight line of the upper shaded region is displaced vertically upward with respect to the left end of the bottom boundary straight line by N tan θ pixels. In a digital image, an inclined straight line can be approximated by a set of multiple short horizontal line segments.

In FIG. 9(a), the image is divided vertically into five regions. A set of five steps is then formed to approximate the inclined straight boundary line shown in FIG. 9(a). The 2-dimensional wavelet transform is then applied to this set of five steps to obtain the image shown in FIG. 9(b). Since the number of wavelet transform coefficients is N/2×N/2 pixels, N/2 wavelet coefficients that have detected the edge are detected in the LH component. Moreover, the right end of the detected edge is displaced vertically upward from the left end of the detected edge by (N/2)tan θ pixels. Of the wavelet transform coefficients that are detected as the edge components, the wavelet transform coefficients inside the divided regions are −I/2 since they are equal to the wavelet transform applied to the horizontal lines in FIG. 8(a). On the other hand, the wavelet transform coefficients on the boundary of each region change.

The wavelet transform coefficients in the LH component is −I/4 both in the case in which the wavelet transform is applied first to the horizontal direction and then to the vertical direction and in the case in which the wavelet transform is applied first to the vertical direction and then to the horizontal direction. Therefore, of the N/2 wavelet transform coefficients that are detected as the edge, the wavelet transform coefficients of the boundaries of the divided regions, the number of which is (N/2)tan θ, are −I/4, and the remaining (N/2)−(N/2)tan θ wavelet transform coefficients are −I/2. Therefore, the energy E is obtained from equation (4) as follows.

$$E=(1/(N/2)^2)\{(-I/2)^2(N/2-(N/2)\tan\theta)+(-I/4)^2(N/2)\tan\theta\}=(I^2/(8N))(4-3\tan\theta)\ 0°\leq\theta\leq 45° \tag{5}$$

$$E=(1/(N/2)^2)\{(-I/4)^2(N/2)/\tan\theta\}=I^2/(8N\tan\theta),\ 45°\leq\theta\leq 90° \tag{6}$$

Since the HL component is symmetric to the LH component with respect to the 45° line, by setting θ'=90°−θ in the equations (5) and (6), the relation between E and θ can be expressed by the same equation.

Similarly, the relation between E and θ in the HH component can be expressed as follows.

$$E=(1/(N/2)^2)\{(-I/4)^2(N/2)/\tan\theta\}=I^2/(8\text{ N}\tan\theta),\ 0°\leq\theta\leq 45°$$

$$E=(1/(N/2)^2)\{(-I/4)^2(N/2)/(90°-\tan\theta)\}=I^2/(8\text{ N}\tan(90°-\theta)),$$
$$45°\leq\theta\leq 90° \quad (7)$$

In FIG. 8(a), the relation between the inclination of the object of detection and the energy of the wavelet transform will be expressed by an equation in the case in which, for example, the total number of pixels is 512×512, the pixel value in the upper half image is 0 and the pixel value in the lower half image is 256. The linear boundary on which the pixel value changes, that is the edge, is the object of detection. By applying the 2-dimensional wavelet transform to this boundary, the image shown in FIG. 8(b) is obtained. The edge component is detected only in the LH component. The value of the wavelet transform coefficient that has detected the edge is $$½(0-256)=-128.$$

Since there are 256×256 wavelet transform coefficients in total, it follows from equation (3) that the energy of this LH component is $$E=(1/(256\cdot 256)(-128)^2\cdot 256=64 \quad (8).$$

The energies of the HL component and HH component are both 0.

Figure 9:
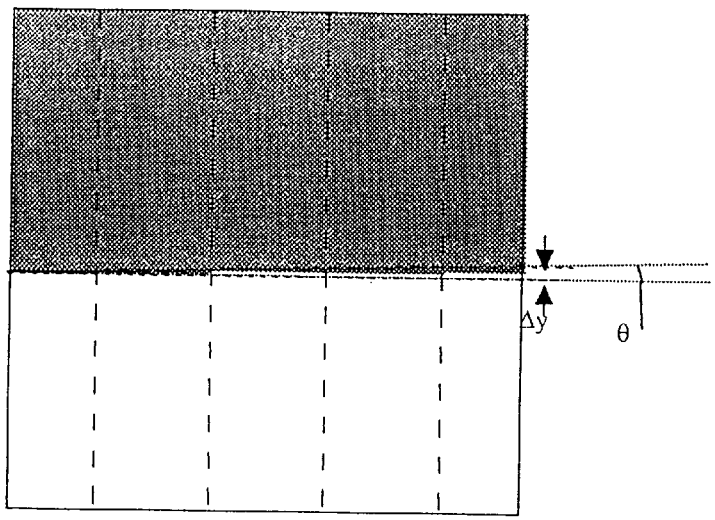
FIG. 9(a) shows an image obtained by rotating the image shown in FIG. 8(a) by a small angle θ.
FIG. 9(b) is an image obtained by applying a 2-dimensional wavelet transform-to the image shown in (a).
Figure 9:
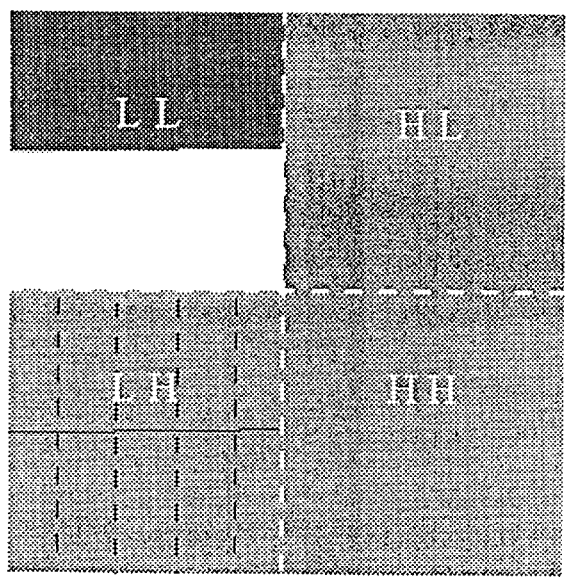

As shown in FIG. 9, when the image shown in FIG. 8(a) is rotated slightly by angle θ, the right end of the boundary line is displace upward from the left end of the boundary line by 512 tan θ pixels since the size of the image is 512×512 pixels. In a digital image, an inclined straight line is represented by a set of multiple short horizontal line segments. In FIG. 9(a), the image is divided vertically into five regions. The 2-dimensional wavelet transform is then applied to these five regions to obtain the image shown in FIG. 9(b). Since the number of wavelet transform coefficients is 256× 256 pixels, 256 wavelet coefficients that have detected the edge are detected in the LH component in total. Moreover, the right end of the detected edge is displaced vertically upward from the left end of the detected edge by 256 tan θ pixels. The values of the wavelet transform coefficients throughout the interior of the five regions are −128 since the wavelet transform components detected as the edge components are equal to the wavelet transform components of the horizontal line segments of the image shown in FIG. 8(a). On the boundaries of the five regions, the values of the wavelet transform coefficients change.

Figure 10:
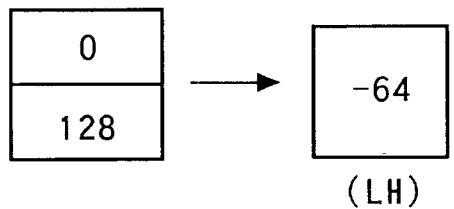
FIG. 10 shows images of 2×2 pixels on the boundaries of the five regions.
Figure 10:
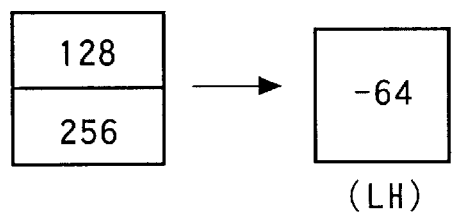

FIG. 10 shows images of 2×2 pixels on the boundaries of the five regions. The unit blocks of the 2-dimensional Haar wavelet transform are the images of 2×2 pixels shown in FIG. 10. Both in the cases of FIGS. 10(a) and (b), the 2-dimensional Haar wavelet transform coefficients of the LH component are −64. Hence, of the 256 wavelet transform coefficients that are detected as the edge, the values of the wavelet transform coefficients of the 256 tan θ of them, which represent the amount of change in the x-direction, are −64, and the values the remaining 256−256 tan θ wavelet transform coefficients, which represent the edge, are −128. Hence, equation (8) yields the energy E as follows.

$$E=(1/(256\cdot 256))\{(-128)^2(256-256\tan\theta)+(-64)^2\cdot 256\tan\theta\}=16(4-3\tan\theta)0°\leq\theta\leq 45° \quad (9)$$

$$E=(1/(256\cdot 256))\{(-64)^2 256/\tan\theta\}=16/\tan\theta 45°\leq\theta\leq 90° \quad (10)$$

So far, the LH component has been explained. Since the HL component is symmetric to the LH component with respect to the 45° line, by setting θ'=90°−θ, the relation between E and θ can be expressed by the same equation.

Similarly, the relation between E and θ in the HH component can be expressed as follows.

$$E=(1/(256\cdot 256))\{(-64)^2 256/\tan\theta\}=16/\tan\theta,0°\leq\theta\leq 45°$$

$$E=(1/(256\cdot 256))\{(-64)^2 256/\tan(90°-\theta)\}=16/\tan(90°-\theta),$$
$$45°\leq\theta\leq 90° \quad (11)$$

C. Calculation of Energy Difference (S26) and Convergence of Energy Difference (S28)

Figure 11:
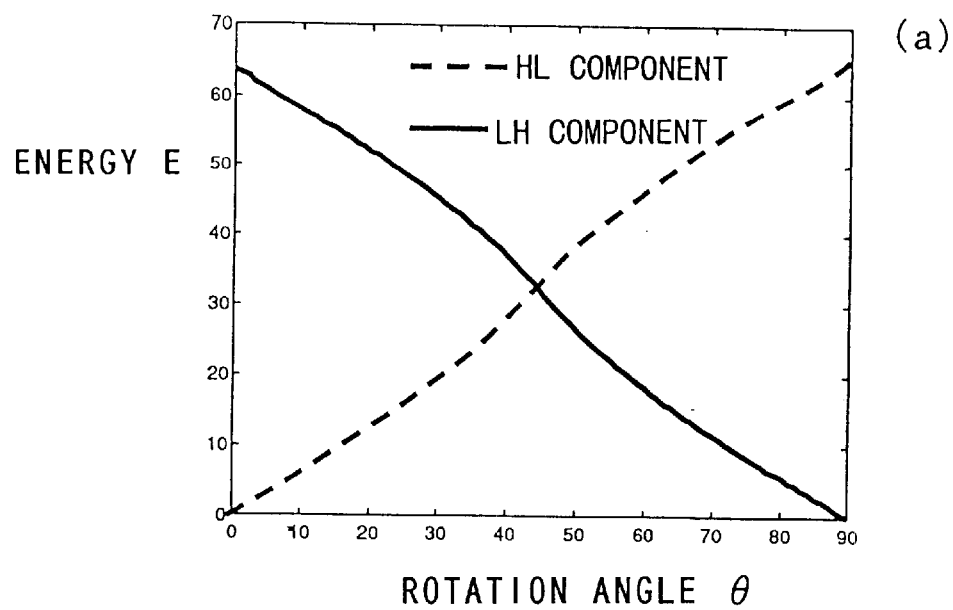
FIG. 11 shows graphs of the energies of the HL, LH, and HH components, respectively, when the sample image shown in FIG. 7(a) is rotated from 0° to 90°.
Figure 11:
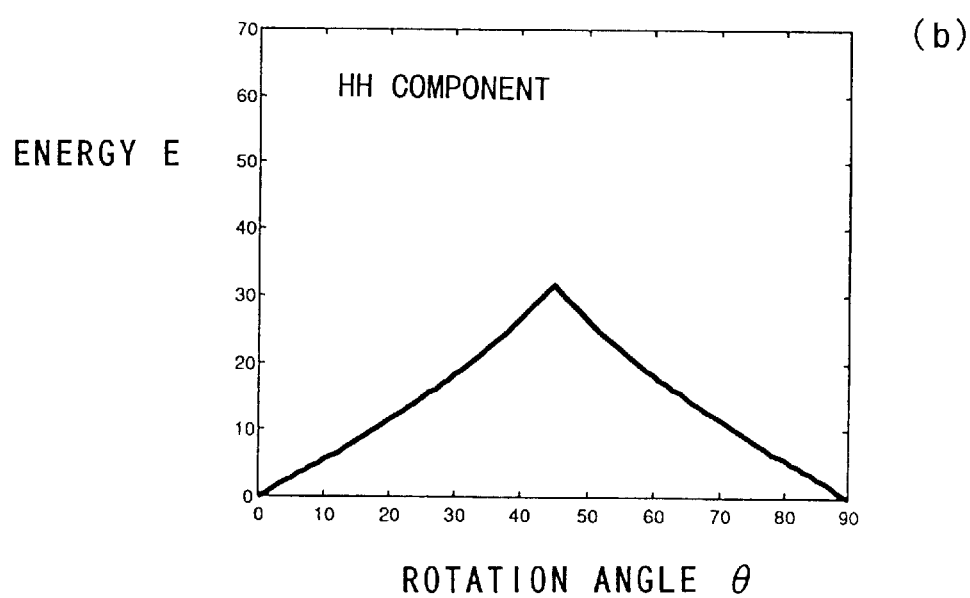

FIG. 11(a) shows the graphs of equations (9) and (10) where the horizontal axis represents the inclination θ and the vertical axis represents the energies of the LH and HL components. FIG. 11(b) shows the graph of the energy of the HH component with respect to change in the inclination θ. The energy of the high frequency component of the wavelet-transformed image data represents the amount of change of the image data with respect to the direction of the wavelet transform. The energies of the LH, HL, and HH components depend on the inclination of the object of inspection. Hence, when the number of edges and the length of each of the edges are known, the inclination θ can be obtained directly from the energy value of the high frequency component of the wavelet-transformed image. However, in practice, the number of edges is unknown, the inclination θ cannot be calculated directly from the energy value of the high frequency component of the wavelet transformed image.

When the edge is inclined by 45°, the energy of the LH component of the wavelet transform becomes equal to the energy of the HL component of the wavelet transform as shown in FIG. 11(a), and the energy of the HH component of the wavelet transform achieves its maximum as shown in FIG. 11(b). Hence, the difference between the energy of the LH component and the energy of the HL component is calculated rotating the image (S26). This difference is then made to converge to a sufficiently small value (S28). Thus, the rotation angle of the image required for the direction of the edge to become 45° can be calculated. However, since a long length of calculation time is required to rotate the image, the direction of the edge may be approached to become 45° by transforming the aspect ratio of the input image. In this case, the aspect ratio of the input image is transformed first to several values. The rotation angle of the input image is then calculated based on the difference between the energy of the LH component and that of the HL component for each of the transformed aspect ratios.

The following table shows the relation between the rotation angle of the image and the energy of each component of the wavelet transformed image.

TABLE 1

| θ | LH component | HL component | HH component |
|---|---|---|---|
| 0° | maximum | minimum | minimum |
| 90° | minimum | maximum | minimum |
| 45°/135° | (LH) = (HL) | (LH) = (HL) | maximum |

In the flow chart shown in FIG. 4, the rotation angle by which the object image needs to be rotated from the initial position to achieve θ=45° or 135° was calculated using the relation equation shown in Table 1 in the case θ=45° or 135°. That is, the property that (energy of LH component)= (energy of HL component) holds at θ=45° or 135° was used. The original inclination of the object image was then calculated based on this calculated rotation angle. However, as an alternative, the rotation angle of the object image by which the object image needs to be rotated from its initial position to achieve θ=0° or 90° may be calculated using the property that the energy of the LH or HL component achieves its extremum at θ=0° or 90° shown in Table 1. In this case also, the inclination of the original object image is calculated based on this calculated rotation angle.

As another alternative, the rotation angle of the object image by which the object image needs to be rotated from the initial position until the energy of the HH component achieves its minimum may be calculated. In this case also, the inclination of the original object image is calculated based on this calculated rotation angle. It should be noted here that the value of the energy of the HH component achieves its minimum both when the object image is rotated to 0° and 90°. Hence, in order to determine whether the object image has been rotated to 0° or 90°, the energy of the LH component is compared with the energy of the HL component. If (energy of LH component)>(energy of HL component), then it can be concluded that θ=0°. If (energy of HL component) >(energy of LH component), then it can be concluded that θ=90°.

In order to increase the calculation accuracy of the rotation angle, the rotation angle of the object of inspection may be calculated based on each of the conditions listed on Table 1 to obtain several rotation angles and take the average of the several rotation angles. In this case, the average is adopted as the rotation angle of the. object image to obtain the inclination of the object image. For example, the rotation angle at which the energy of the LH component achieves the maximum and the rotation angle at which the energy of the HL component achieves the minimum may be calculated. The average of the two rotation angles may be judged to the rotation angle at which the object image achieves the angle 0°. Similarly, the rotation angle at which the energy of the HL component achieves the maximum and the rotation angle at which the energy of the LH component achieves the minimum may be calculated. The average of the two rotation angles may be judged to the rotation angle at which the object image achieves the angle 90°.

As further another method, the rotation angle at which the energy of the LH component achieves the maximum, the rotation angle at which the energy of the HL component achieves the minimum, and the rotation angle at which the energy of the HH component achieves the minimum such that (energy of LH component)>(energy of HL component) holds may be calculated, and the average of the three rotation angles may be judged to be the rotation angle required for the object image to reach 90°.

D. Aspect Ratio Transform (S30)

Figure 12:
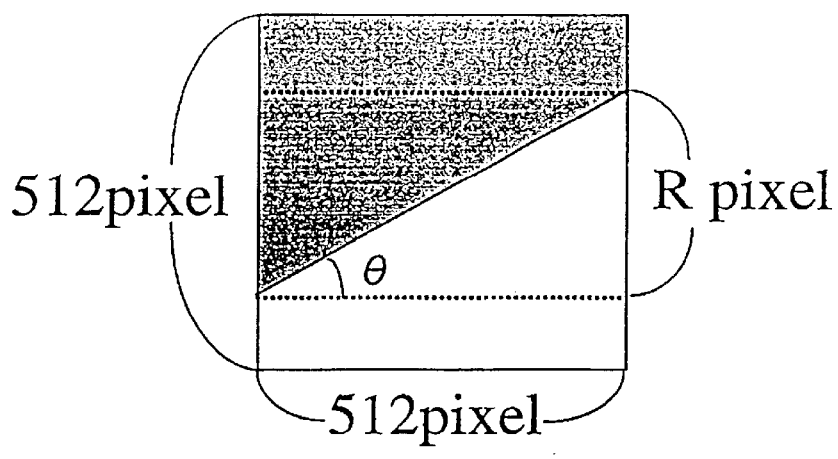
FIG. 12(a) shows an image having one edge that is inclined by angle θ with respect to the horizontal axis.
FIG. 12(b) shows an aspect ratio transformed image obtained from the image shown in (a) by reducing the number of pixels in the x-axis direction to R.
FIG. 12(c) shows an image obtained by rotating the image shown in (b) by 45°.
Figure 12:
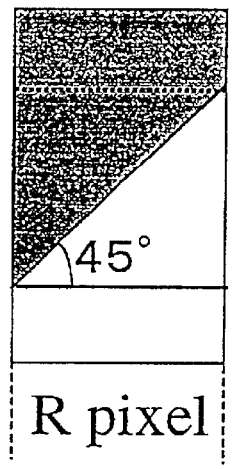
Figure 12:
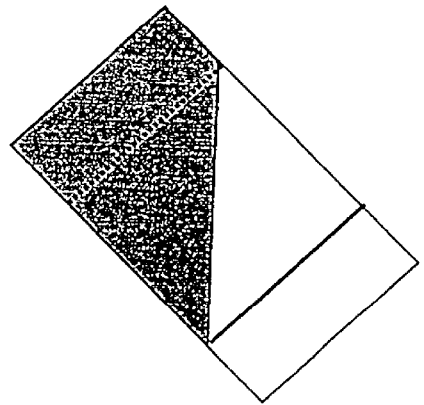

FIG. 12(a) shows an image having one edge that is inclined by angle θ with respect to the horizontal axis. It is assumed here that the size of the input image is 512×512 pixels. This image is reduced in the x-axis direction to obtain an image of size R×512 pixels. As a result, the inclination of the edge becomes 45° as shown in FIG. 12(b). The aspect ratio of the input image V(x, y) of size X×Y pixels can be transformed into an output image S(r, t) of size R×T by the following equation.

$$S(r,t)=V(R \cdot x/X, T \cdot y/Y) \quad (12)$$

R and T are sequentially varied to obtain several images having different aspect ratios. The wavelet transform is applied to each of these several images. Since the processing speed of the wavelet transform is inversely proportional to the number of pixels of the input image, it is desirable to reduce the size of the image in order to increase the processing speed. That is, it is desirable to vary the values of R and T in the range R<X and T<Y. Moreover, when the aspect ratio of the transformed image is the same as that of the original image, that is, when R:T=X:Y, the inclination of the edge remains unchanged. In such a case, the image is not reduced. Therefore, which of R and T is to be varied is determined depending on which of the energy of the LH component of the wavelet-transformed input image V(x, y) and the energy of the HL component of the wavelet-transformed input image V(x, y) is larger.

Figure 13:
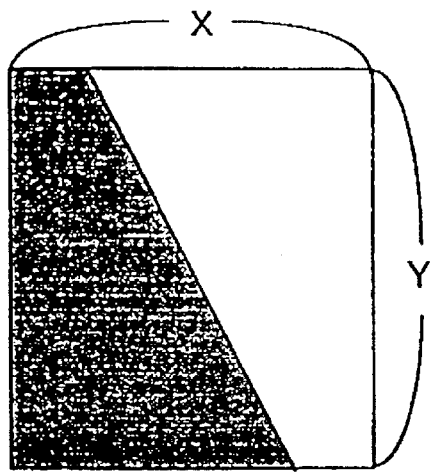
FIG. 13(a) shows an image having an edge that is rotated by an angle between 45° and 90° with respect to the horizontal direction.
FIG. 13(b) shows an aspect ratio transformed image obtained from the image shown in (a) by reducing the number of pixels in the y-axis direction to T.
Figure 13:
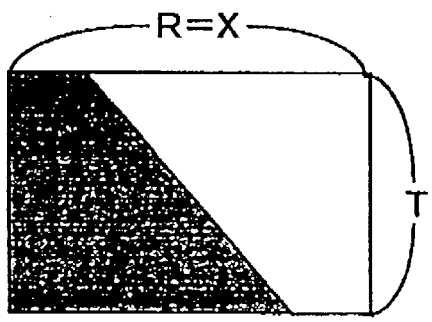
Figure 14:
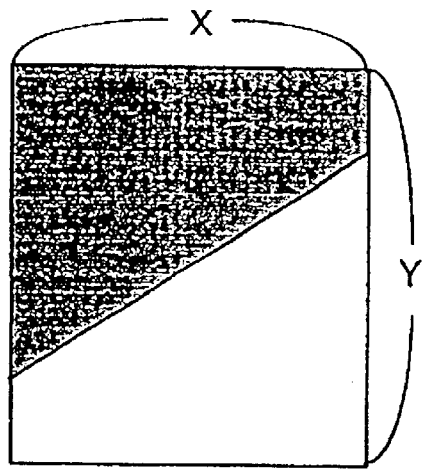
FIG. 14(a) shows an image having an edge that is rotated by an angle between 0° and 45° with respect to the horizontal direction.
FIG. 14(b) shows an aspect ratio transformed image obtained from the image shown in (a) by reducing the number of pixels in the x-axis direction to R.
Figure 14:
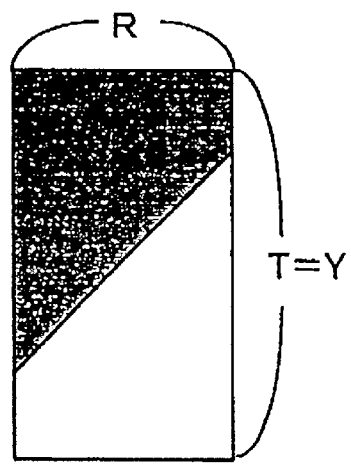

FIG. 13(a) shows an image having an edge such that the vertical length component of the edge is larger than the horizontal length component of the edge. FIG. 13(b) shows an aspect-ratio-transformed image obtained from the image shown in (a) by reducing the number of pixels in the y-axis direction to T. FIG. 14(a) shows an image having an edge such that the horizontal length component of the edge is larger than the vertical length component of the edge. FIG. 14(b) shows an aspect-ratio-transformed image obtained from the image shown in (a) by reducing the number of pixels in the x-axis direction to R. If the image shown in FIG. 13(a) is wavelet-transformed, the relation (energy of HL component)>(energy of LH component) is obtained. In this case, T is varied in the range T<Y while fixing R at R=X. If the image shown in FIG. 13(a) is wavelet transformed, the relation (energy of HL component)<(energy of LH component) is obtained. In this case, R is varied in the range R<X while fixing T at T=Y.

While reducing the image data in one direction, the energy of the high frequency component, that is, the amount of change in the image data, is calculated repeatedly. The image reduction factor in the x or y direction at which (energy of HL component)=(energy of LH component) holds is then obtained. Based on this image reduction factor, the inclination of the object image is detected. As another method, the image reduction factor in the x or y direction at which the energy of the HH component achieves its maximum is obtained. Based on this image reduction factor, the inclination of the object image is detected. Moreover, the inclination of the object image may be detected based on both the inclination of the object image calculated from the image reduction factor at which (energy of HL component)=(energy of LH component) holds and the inclination of the object image calculated from the image reduction factor in the x or y direction at which the energy of the HH component achieves its maximum.

In S30, instead of sequentially transforming the aspect ratio of the input image, the input image may be rotated gradually, for example, 2° at a time. In this case, an image rotating means is installed in place of the aspect ratio transform means 54 shown in FIG. 3. The 2-dimensional wavelet transform is then applied every time the image is rotated (S22), and the energies of the HL, LH, and/or HH components are calculated. The rotation of the image is repeated until these energies satisfy the required conditions (S28). The inclination of the object of inspection is calculated based on the rotation angle at which the required conditions are met.

E. Calculation of Rotation Angle (S32)

For example, it is assumed that the direction of the edge has become 45° when an input image of size X×Y pixels is aspect-ratio-transformed to obtain an image of size R×T pixels. In this case, the rotation angle of the edge of the input image is given by $$\theta=\tan^{-1}((R/T) \cdot (Y/X)) \quad (13).$$

In this way, the rotation angle of the object image can be calculated based on the transform ratio of the aspect ratio transform for the object image required to turn the edge to the 45° direction. Here, the difference between (energy of HL component) and (energy of LH component) achieves its minimum not only at θ=45° but also at θ=135°. Hence, when the difference between (energy of HL component) and (energy of LH component) achieves its minimum, it is necessary to determine whether θ=45° or θ=135°. To accomplish this, the image is further rotated by 45° when (energy of HL component)=(energy of LH component) is achieved, and the further rotated image is wavelet-transformed. The energy of the LH component of the wavelet-transformed image is then compared with the energy of the HL component of the wavelet-transformed image.

For example, it is assumed that the image shown in FIG. 12(a) has been aspect-ratio-transformed to obtain the image shown in FIG. 12(b), and that θ=30° has been obtained from equation (3). This image can be obtained by rotating the original image by 30°–45°. By wavelet-transforming the image rotated by 45° once more, the horizontal component of the wavelet-transformed edge becomes zero. Therefore, (energy of HL component)>(energy of LH component) holds for the wavelet-transformed image. Hence, it is judged that the inclination of the object image is θ=30°. On the other hand, if (energy of HL component)<(energy of LH component) holds for the wavelet-transformed image, it is judged that the inclination of the object image is (180−30)°. In this way, the inclination of the object image can be calculated.

F. Interpolation Process (S34)

In S30, since the input image is reduced in the vertical or horizontal direction by the unit of 5 pixels, an error is generated with respect to the optimal aspect ratio transform factor within the error margin of ±2.5 pixels. As a result, this error propagates to the inclination of the object image calculated in S32. Hence, in S34, the inclination of the object image is calculated with a higher degree of accuracy by interpolating the two rotation angles obtained in the rotation angle calculation process (S32). A polynomial approximation curve or a spline approximation may be used for the interpolation process.

Figure 15:
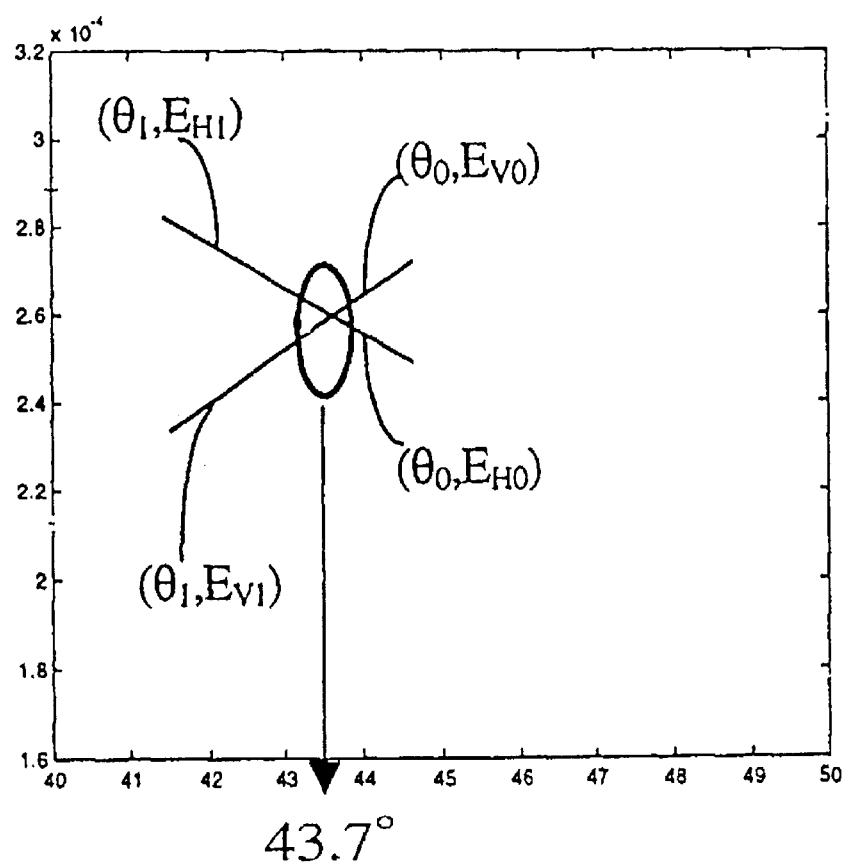
FIG. 15 is a graph showing an interpolation process by the simplest linear approximation.

FIG. 15 is a graph showing an interpolation process by the simplest linear approximation. The horizontal axis represents the rotation angle of the object image, and the vertical axis represents the magnitude of energy at each rotation angle. In FIG. 15, the positively sloped line represents the energy of the vertical component, and the negatively sloped line represents the energy of the horizontal component. The point at which the energy of the vertical component becomes equal to the energy of the horizontal component is the intersection of the two lines that is enclosed with an ellipse. To the left of this intersection, the energy of the horizontal component is larger than the energy of the vertical component. To the right of this intersection, the energy of the horizontal component is smaller than the energy of the vertical component. At θ=θ$_1$, which lies to the left of the intersection, the energy $E_{H1}$ of the horizontal component is larger than the energy $E_{V1}$ of the vertical component. At θ=θ$_0$, which lies to the right of the intersection, the energy $E_{H0}$ of the horizontal component is smaller than the energy $E_{V0}$ of the vertical component. The rotation unit of the image is represented by Δθ(=θ$_0$−θ$_1$). Then, the rotation angle of the object image at the intersection can be represented by $$\theta=\theta_1+(\Delta\theta)|E_{H1}-E_{V1}|/(|E_{H0}-E_{V0}|+|E_{H1}-E_{V1}|) \quad (14).$$

In the case shown in FIG. 15, the above equation yields θ=43.7°. As a result, the error contained in the inclination of the object image is reduced.

2. Embodiment 2 (Calculation of Inclination Based on Energy)

In the above-described embodiment, the inclination of the object image is calculated based on the rotation angle of the image or the aspect ratio transform factor of the image when the energies of the wavelet-transformed components satisfy the prescribed conditions. However, as another embodiment, the 2-dimensional wavelet transform may be applied directly to the object image. In this case, the energy of each component is used to directly calculate the inclination of the object image.

Figure 16:
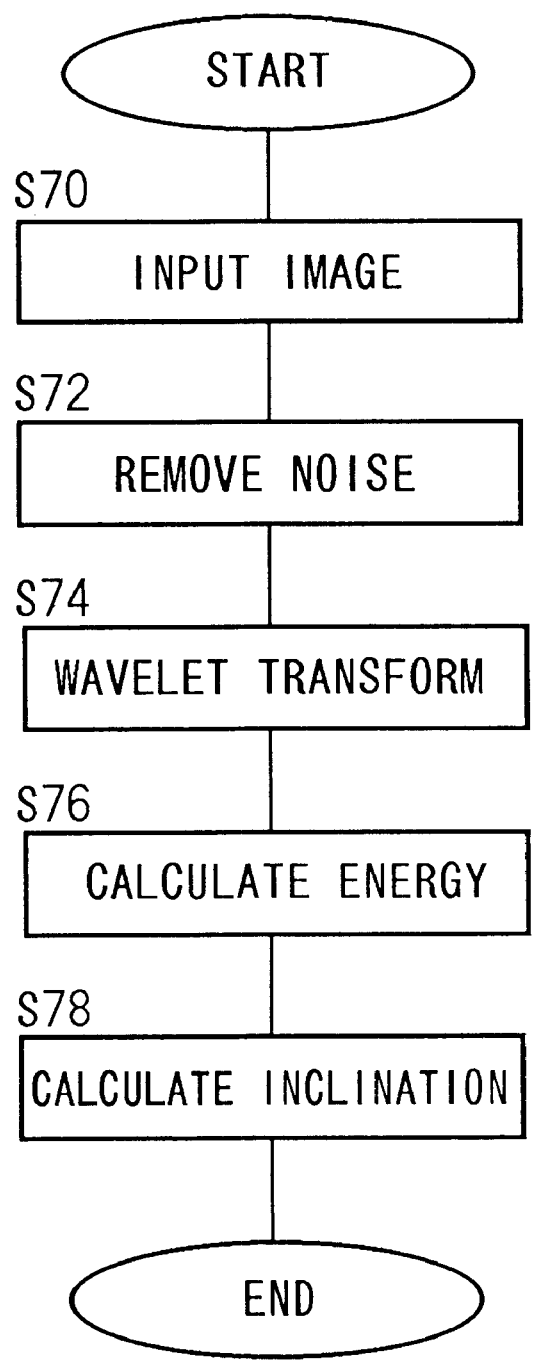
FIG. 16 is a flowchart showing the operation in the second embodiment.

FIG. 16 is a flowchart showing the operation in the second embodiment. First, an image is input (S70), and noise is removed from the input image (S72). Next, the noise-removed image is wavelet-transformed (S74). The energy is then calculated (S76). Based on the energy calculated in S76, the inclination of the image is calculated (S78). In S78, for example, in obtaining the inclination θ from the energy of the LH component, the energy of the LH component is represented by $E_{LH}$, and equations (5) and (6) are solved for θ. This yields the following result.

$$\theta=\arctan(4/3-(8NE_{LH})/(3I^2)), \; 0°\leq\theta\leq 45° \quad (15)$$

$$\theta=\arctan(I^2/8NE_{LH}), \; 45°\leq\theta\leq 90° \quad (16)$$

Figure 17:
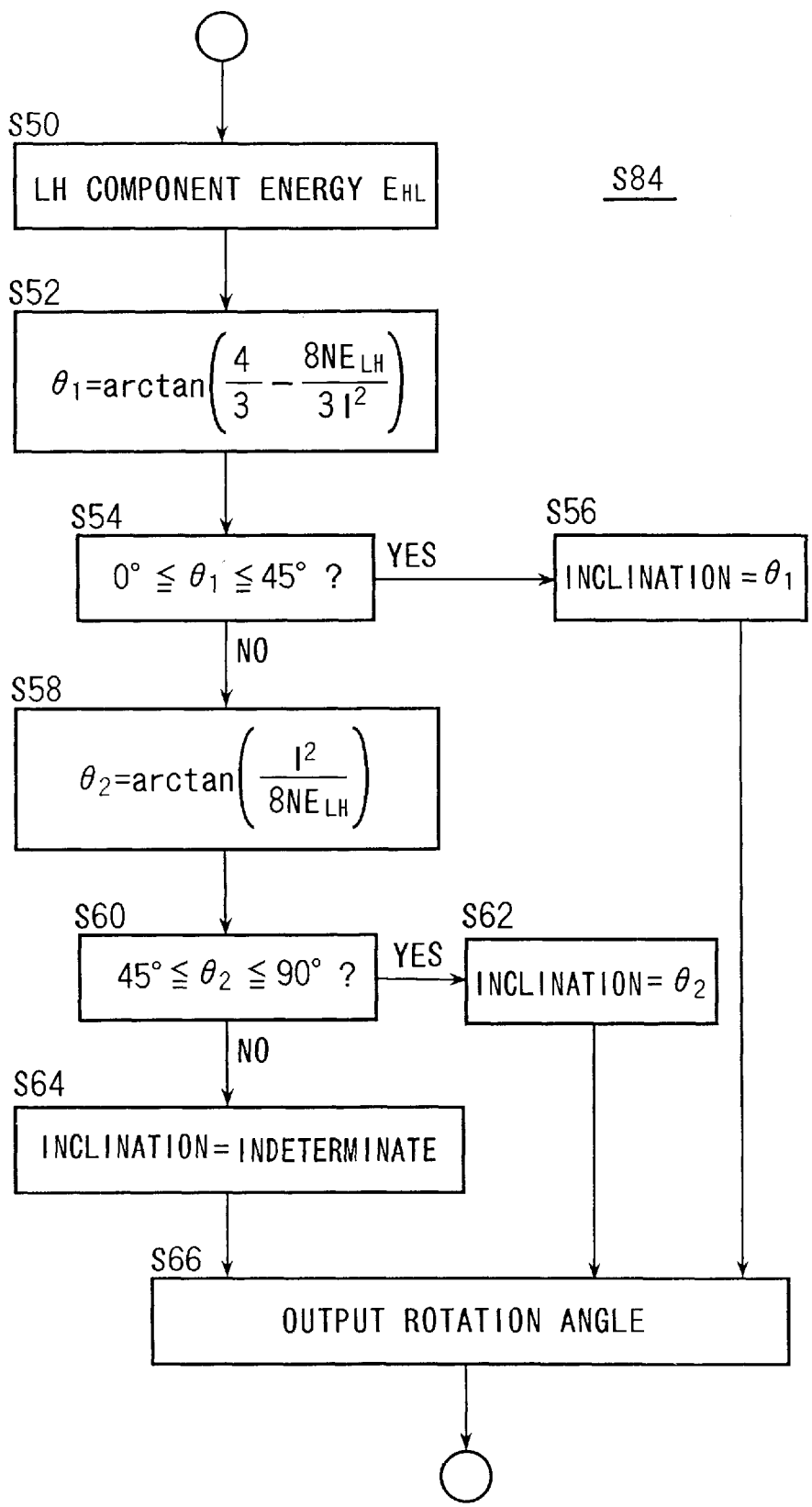
FIG. 17 is a flowchart-showing the detail of the inclination calculation process shown in FIG. 16.

FIG. 17 is a flowchart showing the detail of the inclination calculation process shown in FIG. 16. This flowchart shows the operation for calculating the inclination of the object image based on the energy $E_{HL}$ of the LH component. First, the energy $E_{LH}$ of the LH component is calculated (S50). Next, θ$_1$ is calculated using equation (15). It is then checked whether the calculated value θ$_1$ lies in the range 0°≤θ$_1$≤45° or not (S54). If the calculated value lies in the range 0°≤θ$_1$≤45°, then the inclination of the object image is output as θ$_1$ (S56) (S66). If the calculated value does not lie in the range 0°≤θ$_1$≤45°, then θ$_2$ is calculated using equation (16) (S58). It is then checked whether the calculated value θ$_2$ lies in the range 45°≤θ$_2$≤90° or not (S60). If the calculated value lies in the range 45°≤θ$_2$≤90°, then the inclination of the object image is output as θ$_2$ (S62). If the calculated value does not lie in the range 45°≤θ$_2$≤90°, then the calculated value is output as an error (inclination is indeterminate) (S64).

Similarly, the inclination of the object image can be calculated based on the energy $E_{HL}$ of the HL component as follows.

$$\theta=90°-\arctan(4/3-(8NE_{HL})/(3I^2)), \; 0°\leq\theta\leq 45° \quad (17)$$

$$\theta=90°-\arctan(I^2/8NE_{LH}), \; 45°\leq\theta\leq 90° \quad (18)$$

Since $E_{HH}$ is symmetric with respect to θ=45°, in detecting the inclination of the image using the energy $E_{HH}$ of the HH component, the inclination is detected only for 0°≤θ≤45° based on equation (7).

$$\theta=\arctan(I^2/8NE_{HH}), \; 0°\leq\theta\leq 45° \quad (19)$$

In using equations (15) through (19), the image size N and the brightness value I of the edge portion need to be known. Hence, base on equations (5) and (6), the ratio $E_{LH}/E_{HL}$ is calculated. The ratio $E_{LH}/E_{HL}$ is a function that depends only on the inclination θ as follows.

$$E_{LH}/E_{HL}=(I^2/(8N))(4-3\tan\theta)/\{I^2/(8N\tan(90°-\theta))\}=(4-3\tan\theta)/\tan\theta, \; 0°\leq\theta\leq 45°$$

$$E_{LH}/E_{HL}=(I^2/(8N\tan\theta))/\{(I^2/(8N))(4-3\tan(90°-\theta))\}=1/(4\tan\theta-3), \; 45°\leq\theta\leq 90° \quad (20)$$

Setting $E_{LH}/E_{HL}=R$, the above equations are solved for $\theta$ to obtain the following result.

$$\theta=\arctan(4/(R+3)), \ 0°\leq\theta\leq45°$$
$$\theta=\arctan((3R+1)/4R), \ 45°\leq\theta\leq90° \quad (21)$$

These equations show that the inclination can be obtained by using $E_{LH}/E_{HL}$ even if the image size and the brightness of the edge portion are unknown. The inclination can also be obtained by using in $E_{HL}/E_{LH}$ place of $E_{LH}/E_{HL}$.

Since the denominator of R can become 0, $R'=E_{LH}/(E_{HL}+E_{LH})$ is used in place of $R=E_{LH}/E_{HL}$. $R'$ is also a function of $\theta$ alone. Therefore, the inclination can be obtained using $R'$. Moreover, since $0\leq R'\leq 1$, the inclination can be obtained without processing an exceptional case. In this case, $\theta$ can be expressed as follows.

$$\theta=\arctan((4-4R')/(3-2R')), \ 0°\leq\theta\leq45°$$
$$\theta=\arctan((2R'+1)/4R'), \ 45°\leq\theta\leq90° \quad (22)$$

The equations shown above are inclination calculation equations for the case in which the sum of the squares of all the wavelet transform coefficients is defined as. the energy of the wavelet transform. As an alternative, the inclination of the inspection object can also be obtained by defining the sum of the absolute values of all the wavelet transform coefficients as the energy of the wavelet transform.

$$E=(1/MN)\Sigma_{m=1}^{M}\Sigma_{n=1}^{N}|X(m,n)| \quad (23)$$

By this process, the inclination of the inspection object can be detected.

Figure 18:
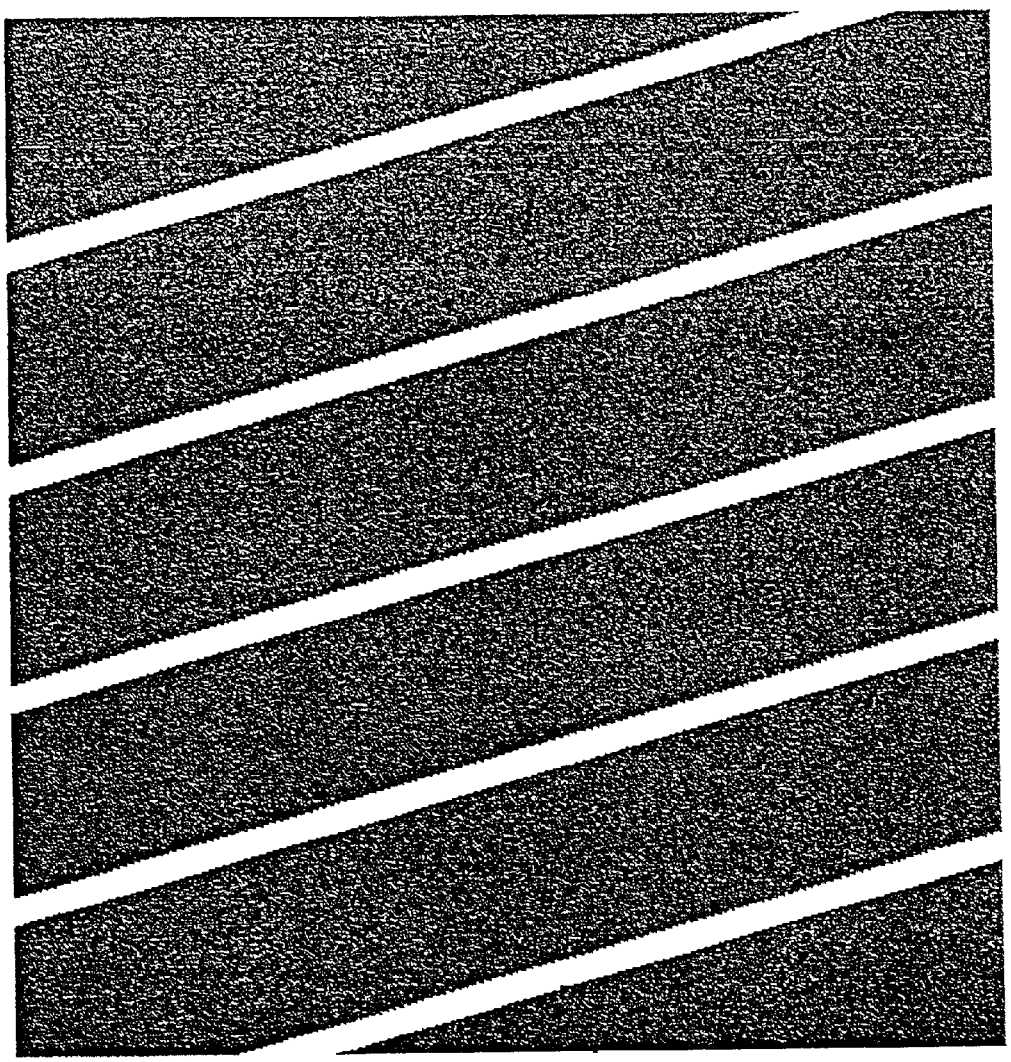
FIG. 18 shows a sample image input in the second embodiment.

FIG. 18 is a sample image input in the second embodiment. This sample image schematically represents the digital image data of a semiconductor wafer input from the image input device. The white lines represent the wire patterns. These wire patterns are inclined by 15° with respect to the horizontal direction. The energies of the HL, LH, and HH components were calculated in the energy calculation means 52. The obtained result was $E_{LH}=172.66$, $E_{HL}=15.97$, and $E_{HH}=14.01$.

These values were transferred to the inclination estimation means 55 to calculate $R'=E_{LH}/(E_{HL}+E_{LH})$. The result was $R'=0.9153$. This value was substituted into equation (22) to obtain $\theta=14.017°$. This value of $\theta$ was output as the inclination of the object image to the display unit 35 of the computer to obtain the inclination of the object image.

According to the conventional template matching method, both the multiplication and the addition required $9N^2(1+4N^2)$ steps, and the memory access required $74N^2$ steps. In contrast, according to this embodiment, the wavelet transform was introduced. As a result, the addition and subtraction both require $21N^2$ steps, the multiplication and division both require $12N^2$ steps, and the memory access requires $2N^2$ steps. When the original image has 512×512 pixels, the inclination of the original image can be detected more than 100 times faster than the conventional template matching method.

3. Other Embodiments (1) Overlapped Sampling Haar Wavelet Transform

The edge could be detected by applying the Haar wavelet transform to the input signal given by equation (1). However, if the following image x(n) obtained by shifting by one dot to the right the edge of the signal given by equation (1) is wavelet-transformed, the result shown in equation (25) is obtained, in which no edge can be detected.

$$x(n)=\{0,0,0,0,0,0,0,0,2,2,2,2,2,2,2,2\} \quad (24)$$

↑edge $$X(N)=\{0, 0, 0, 0, 2, 2, 2, 2, 0, 0, 0, 0, 0, 0, 0, 0\}$$

scaling function   wavelet function (low pass component) (high pass component) (25)

That is, the edge that exists at the odd numbered position of the input signal is detected, and the edge that exists at the even numbered position of the input signal is not detected. This is because the Haar wavelet transform samples every other of two adjacent signals. Hence, the edge that exists between successive wavelet basis functions is not detected, causing an error. As a result, this error propagates to the inclination and energy of the object to be detected in the 2-dimensional image. That is, since a portion of the edge component of the object of examination is not detected, the obtained energy quantity deviates from the values obtained by the theoretical equations (5), (6), and (7). Thus, the detection accuracy of the inclination deteriorates.

This problem can be solved by shifting the basis function by one bit and repeatedly sampling the original image. When the overlapped sampling Haar wavelet transform is applied to the input signal x(n), the following transform result X(N) is obtained.

| Low Pass component (scaling function) | High Pass component (wavelet function) |
|---|---|
| $X(0) = g0 \cdot x(0) + g1 \cdot x(1)$ | $X(16) = h0 \cdot x(0) + x1 \cdot x(1)$ |
| $X(1) = g0 \cdot x(2) + g1 \cdot x(3)$ | $X(17) = h0 \cdot x(1) + x1 \cdot x(2)$ |
| $X(2) = g0 \cdot x(4) + g1 \cdot x(5)$ | $X(18) = h0 \cdot x(2) + x1 \cdot x(3)$ |
| . | . |
| . | . |
| . | . |
| $X(15) = g0 \cdot x(14) + g1 \cdot x(15)$ | $X(31) = h0 \cdot x(14) + x1 \cdot x(15)$ |

By using this overlapped sampling Haar wavelet transform, the edge of the input signal can be detected regardless of the position of the edge of the input signal. Therefore, when this overlapped sampling Haar wavelet transform is extended to two dimensions, the values obtained from equations (5) through (7) completely agree with the result obtained by actually rotating the image.

As another method, the following procedure may be performed. The original image is first wavelet-transformed. The original image is then shifted by one bit in the direction the wavelet transform was applied. After this, the wavelet transform is applied again to the shifted image. In this case, by adding the energy of the high frequency component of the image to which the first the wavelet transform has been applied to the energy of the high frequency component of the image to which the second the wavelet transform has been applied, changes caused at all positions in the original image can be detected in the same manner as in the case in which the overlapped sampling wavelet transform is applied.

(2) Multiple Resolution Analysis

By applying the wavelet transform after pre-reducing the image data, the length of time required to apply the wavelet transform and calculate the energy and rotation angle can be shortened. In order to simplify the calculation of the image data reduction, it is desirable to reduce the reduction ratio of the image in the X and Y directions to, for example, ½.

The image can be compressed using the wavelet transform also. In this case, the wavelet transform is applied in multiple stages. That is, the first wavelet transform is applied before rotating the input image. The process shown in FIG. 4 is then applied to the LL component of the obtained image as the input image. For example, when the size of the initial input image is 512×512, if the multiple resolution analysis is applied in two stages, the size of the input image is reduced to 128×128, that is, 1/16 of the initial size. The amount of each image processing operation used in the present invention is proportional to the number of pixels of the input image. Therefore, by using the image reduced to 1/16 of the size of the original image as the input image, the processing speed is increased by 16 times. By using the 2-dimensional wavelet transform explained above, the rotation angle of the object of detection in the image, such as a semiconductor wafer pattern or the like, can be detected at high speed.

(3) Memory Configuration

Figure 19:
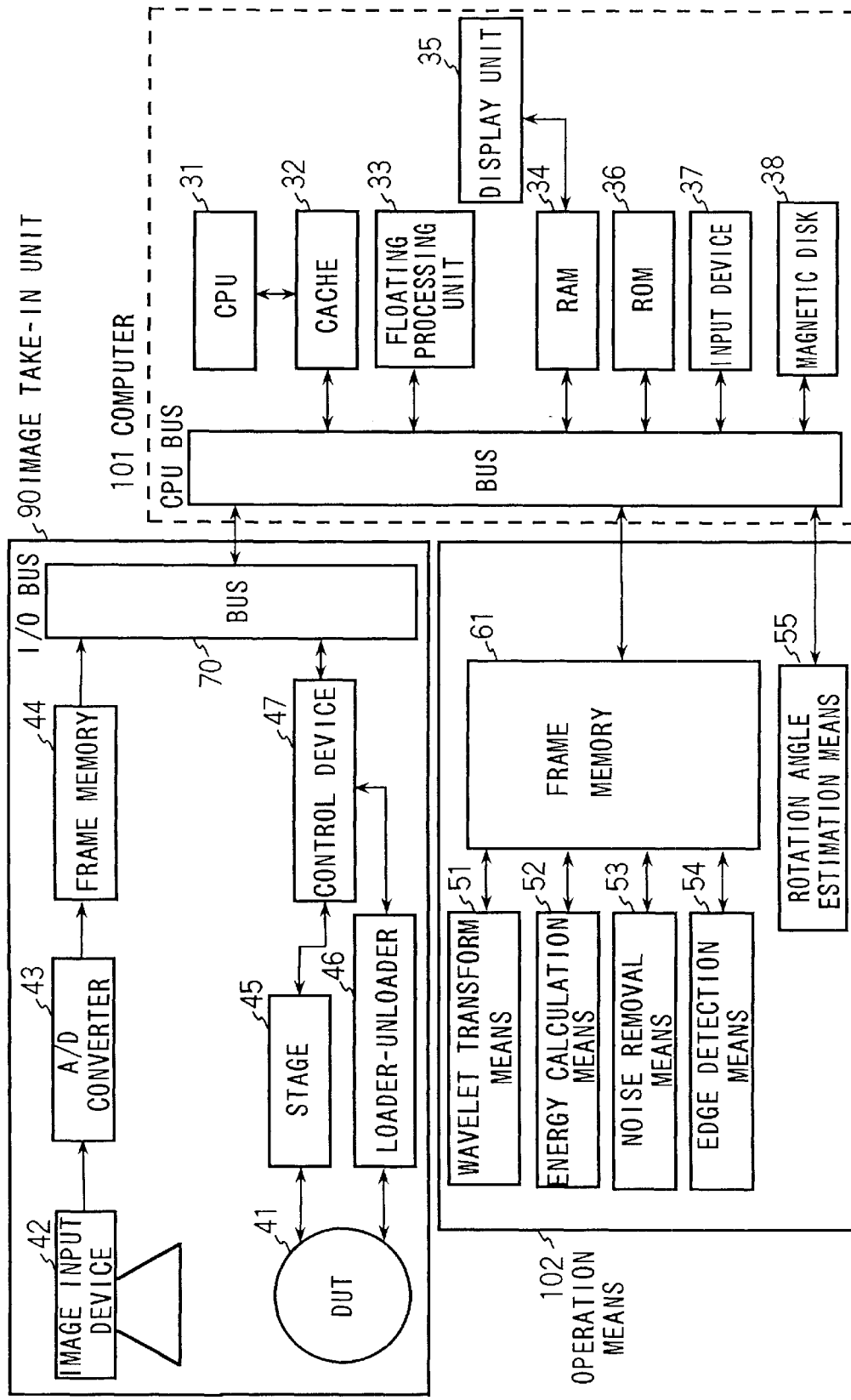
FIG. 19 shows the configuration of another image processing apparatus according to the present invention.

FIG. 19 shows the configuration of another image processing apparatus according to the present invention. In the configuration shown in FIG. 3, a specific frame memory is installed for each of the four processing means in the operation means 102. However, in this example, all the four processing means in the operation means 102 are commonly connected to one frame memory 61. As a result, the memory space is saved, and the utilization efficiency of the memory is improved. The devices 41 through 47 may be replaced with devices installed in a general purpose electron microscope or CCD image input system. Moreover, the image processing means 51 through 54 and the frame memory 61 connected to the image processing means 51 through 54 may be replaced with a software process by the computer 101 such as a work station.

EXAMPLE

An example of the present invention will be explained with reference to FIG. 3. The image data stored in the frame memory 44 or RAM 34 is first transferred as input image data to the frame memory 61. The wavelet transform means 51 then applies the 2-dimensional wavelet transform to the transferred input image data. The transformed result is then transferred to the frame memory 62. Next, the energy calculation means 52 calculates the energies of the HL and LH components, respectively, and compares the values of the two energies with each other. Based on the result of the comparison, it is determined whether the aspect ratio transform is to be applied in the X direction or Y direction. In the case of the image shown in FIG. 5(a), since (energy of LH component)>(energy of HL component) holds, the image is reduced in the X direction. Here, the energy calculation means 52 performs the aspect ratio transform reducing the number of pixels in the X direction five pixels at a time from 256 like 251, 246, . . . .

The result of the transformation is then transferred to the frame memory 63. The transferred image is then sent to the noise removal means 53 which performs, for example, a median filter process to remove noise from the image. The noise-removed image is then transferred to the frame memory 61. Next, the wavelet transform means 51 applies the 2-dimensional wavelet transform to the image. The transformed result is then transferred to the frame memory 62. Next, the energy calculation means 52 calculates the energies of the LH, HL, and HH components, respectively, and stores the calculation results in the RAM 34. These processes are applied to the image changing, for example, the number of pixels in the x-axis direction from 251 pixels to 101 pixels and the difference between the energy of the LH component and the energy of the HL component is calculated.

Figure 20:
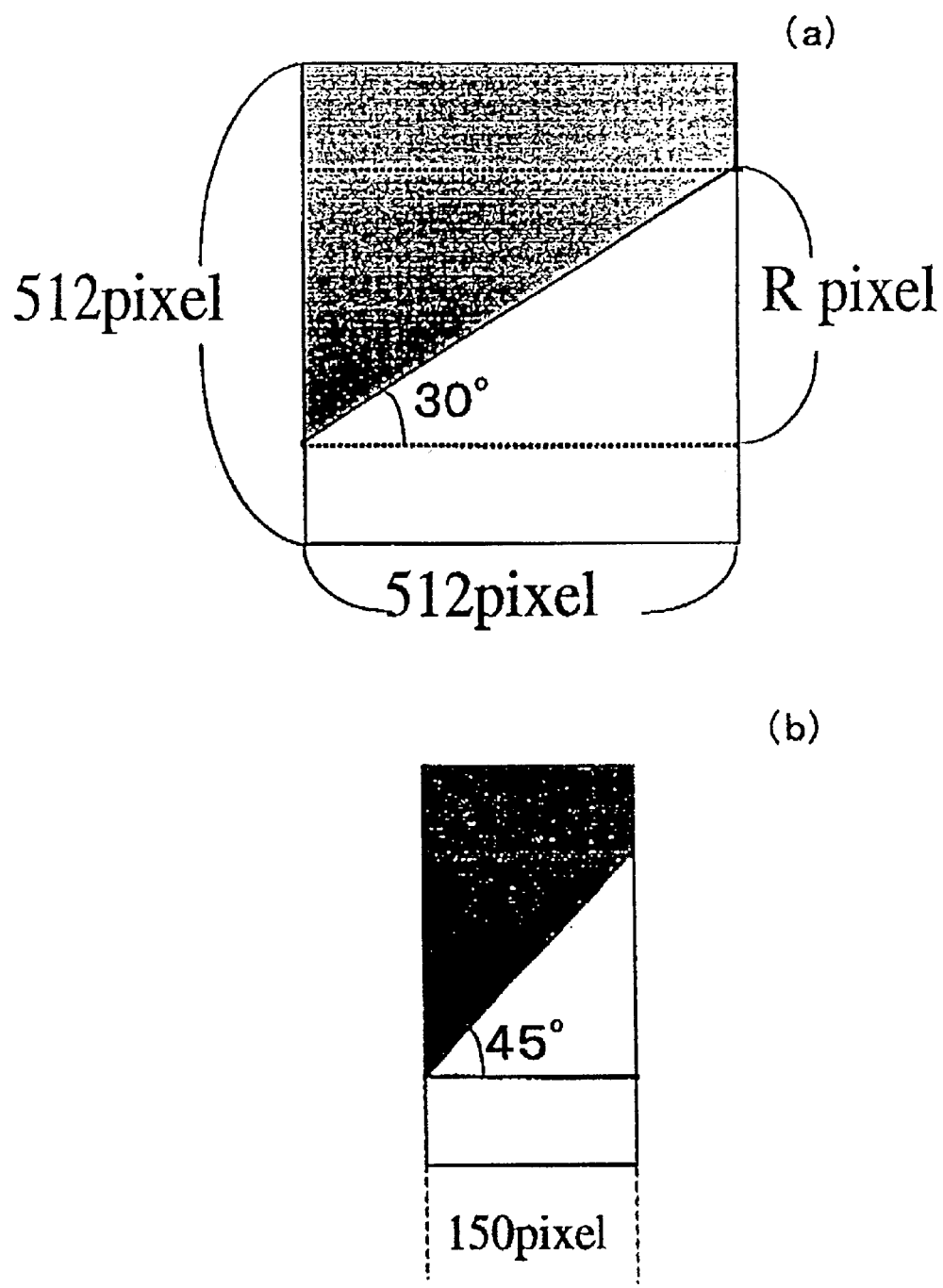
FIG. 20(a) shows an exemplary original image of size 512×512 pixels.
FIG. 20(b) shows the result of the aspect ratio transform applied to the image shown in (a) that minimizes the energy difference between the HL component and LH component.
Figure 21:
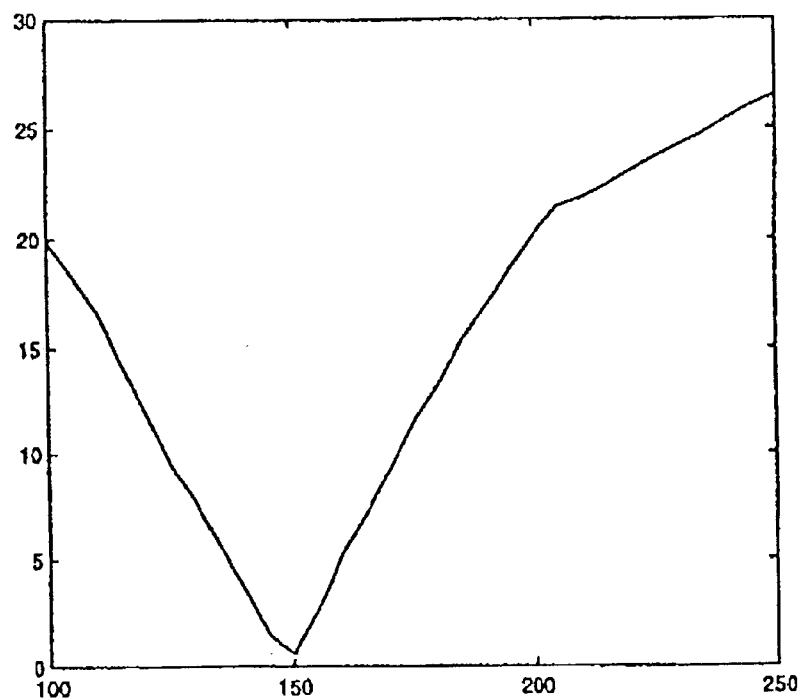
FIG. 21 shows the energy difference between the HL component and LH component of the horizontally aspect-ratio-transformed image of the image shown in FIG. 20(a) plotted for the number of pixels in the horizontal direction ranging from 101 to 251.

FIG. 20(a) shows an exemplary original image of size 512×512 pixels. FIG. 20(b) shows the result of the aspect ratio transform applied to the image shown in (a) that minimizes the energy difference between the HL component and LH component. FIG. 21 shows the energy difference between the HL component and LH component of the horizontally aspect-ratio-transformed image of the image shown in FIG. 20(a) plotted for the number of pixels in the horizontal direction ranging from 100 to 250. It can be seen from FIG. 21 that the energy difference is minimized when the number of pixels in the horizontal direction is 150.

That is, the angle of the edge becomes 45° when the input image is aspect-ratio-transformed to 150×256 pixels as shown in FIG. 20(b). By substituting R=150, T=256, X=512, Y=512 into Equation (13), the inclination of the input image can be obtained, which turns out to be 30.36°. Moreover, the image shown in FIG. 20(b) is rotated by 45°, the rotated image is wavelet-transformed, and the energy of the HL component of the wavelet-transformed image is compared with the energy of the LH component of the wavelet-transformed image. As a result, (energy of HL component)>(energy of LH component) is obtained. It is hence determined that the edge is inclined by 30.36° with respect to the horizontal direction. This information is then output to the display unit 35 of the computer.

As an alternative, the size of the image may be reduced by first transferring the original image to the frame memory 61, and then performing a multiple resolution analysis using the wavelet transform means 51. For example, when the original input image has 256×256 pixels, the multiple resolution analysis is applied twice to the original input image. The low pass component (LL component) of the resultant image is then used as the input image of size 64×64. The amount of operation of the subsequent processes is proportional to the number of pixels of the input image. Hence, by using the input image that has been reduced to 1/16 of the original image size, the amount of operation is reduced to 1/16.

As is clear from the explanation above, according to the present embodiment, the inclination of an object of detection can be specified even from an unclear image whose edge cannot be detected by the conventional template matching method. Moreover, according to the conventional template matching method, both the multiplication and the addition require $9N^2(1+4N^2)$ steps, and the memory access requires $74N^2$ steps. In contrast, according to the above-described example, by introducing the wavelet transform, the addition and subtraction requires $12N^2$ steps, the multiplication and division requires $40N^2$ steps, and the memory access requires $36N^2$ steps. That is, if the original image has 512×512 pixels, the inclination of the image can be detected 40 times faster than the conventional template matching method.

So far, the present invention has been explained using preferred embodiments. However, the range of technical applications of the present invention is not limited to these embodiments. Other variations and modifications of the above-described embodiments should be evident to those skilled in the art. Accordingly, it is intended that such alterations and modifications be included within the scope and spirit of the present invention as defined by the following claims.

Thus, according to the present invention, the inclination of a specific object of inspection that exists within a digital image can be automatically detected by an apparatus that uses a 2-dimensional wavelet transform. Moreover, according to the present invention, the processing speed and the inclination detection performance can be increased significantly.

What is claimed is:

1. An image processing apparatus for detecting an inclination of an object, comprising:
   a read means which reads said object and outputs image data;
   an amount of change calculation means which calculates a sum of amounts of change of said image data in said object in at least one direction, wherein said amount of change calculation means has a means which calculates said sum calculated in a first direction in said object and said sum calculated in a second direction that is perpendicular to said first direction, and wherein said inclination calculation means has a means which calculates said inclination of said object using a ratio between said sum calculated in said first direction and said sum calculated in said direction; and
   an inclination calculation means which calculates an inclination of said object based on said sum calculated by said amount of change calculation means.

2. An image processing apparatus as claimed in claim 1, wherein said amount of change calculation means calculates differences between pixel values of a plurality of pixels in said one direction at a plurality of locations in said image data, and sums up said differences between said pixel values of said plurality of pixels to calculate said sum calculated in at least said one direction, and wherein, when an number of pixels of said image data, an sum between two pixels of said image data, said sum calculated in said first direction, and said sum calculated in said second direction are represented by N, I, $E_{HL}$, and $E_{LH}$, respectively, said inclination calculation means calculates said inclination substantially based on $$R' = E_{LH}/(E_{HL}+E_{LH})$$
$$\theta = \arctan((4-4R')/(3-2R')), \ 0° \leq \theta \leq 45°$$
$$\theta = \arctan((2R'+1)/4R'), \ 45° \leq \theta \leq 90°.$$

3. An image processing apparatus for detecting an inclination of an object, comprising:
   a read means which reads said object and outputs image data;
   an amount of change calculation means which calculates a sum of amounts of change of said image data in said object in at least one direction; and
   an inclination calculation means which calculates an inclination of said object based on said sum calculated by said amount of change calculation means; wherein said inclination calculation means has a modification means which modifies said image data to create a modified image that corresponds to said image data when said object is rotated; and a repetition means which repeats having said amount of change calculation means calculate said sum, while having said modification means modify said image; and
   said inclination calculation means calculates said inclination of said object based on an amount of modification of said image data modified by said modification means when said sum satisfies a prescribed condition.

4. An image processing apparatus as claimed in claim 3, wherein said modified image is a rotated image of said image data.

5. An image processing apparatus as claimed in claim 3, wherein said modified image is an image obtained by reducing said image data in at least said one direction.

6. An image processing apparatus as claimed in claim 3, wherein said inclination calculation means detects said inclination of said object based on said amount of modification of said image data at which said sum calculated in at least said one direction is maximized.

7. An image processing apparatus as claimed in claim 3, wherein said inclination calculation means detects said inclination of said object based on said amount of modification of said image data at which said sum calculated in at least said one direction is minimized.

8. An image processing apparatus as claimed in claim 3, wherein said amount of change calculation means has:
   a wavelet transform means which wavelet-transforms said image data;
   an energy calculation means which calculates an energy of a high frequency component of said image data contained in said wavelet-transformed image data; and
   an output means which outputs said energy as a value that represents said sum.

9. An image processing apparatus as claimed in claim 3, wherein said amount of change calculation means has:
   a first transform means which wavelet-transforms said image data in a first direction of said object;
   a second transform means which wavelet-transforms in a second direction distinct from said first direction an image element that represents a high frequency component of said image data wavelet-transformed by said first transform means;
   a second-stage energy calculation means which calculates an energy of a high frequency component of said image data wavelet-transformed by said second transform means; and
   a second-stage output means which outputs said energy as a value that represents said sum calculated in a central direction of said two directions.

10. An image processing apparatus as claimed in claim 3, wherein said inclination calculation means obtains a plurality of amounts of modification for said image data when said sum satisfies a prescribed condition, and wherein said inclination calculation means further has an interpolation means which interpolates said plurality of amounts of modification for said image data to obtain an interpolated value and calculates said inclination of said object based on said interpolated value.

11. An image processing apparatus as claimed in claim 10, wherein said interpolation means calculates said inclination of said object based on said plurality of amounts of modification and said sum associated with each of said plurality of amounts of modification.

12. An image processing apparatus as claimed in claim 3, wherein said amount of change calculation means has:
   a shift means which shifts said image data by one bit in a direction in which said image data is to be wavelet-transformed;
   a first wavelet transform means which wavelet-transforms said image data before said image data is shifted by one bit;
   a second wavelet transform means which wavelet-transforms said image data after said image data is shifted by one bit;
   a third-stage energy calculation means which calculates an energy of a high frequency component of said image data wavelet-transformed by said first and second wavelet transform means; and
   a third-stage output means which outputs said energy as a value that represents said sum.

13. An image processing apparatus as claimed in claim 8, wherein said wavelet transform performed by said wavelet transform means is a Haar wavelet transform.

14. An image processing apparatus as claimed in claim 8, wherein said wavelet transform performed by said wavelet transform means is an overlapped sampling wavelet transform which detects all amounts of change of said image data in a direction in which said wavelet transform is applied.

15. An image processing apparatus as claimed in claim 3, further comprising a noise removal means for removing a noise from said image data.

16. An image processing apparatus as claimed in claim 3, further comprising an image reduction means which pre-reduces said image data by ½.

17. An image processing apparatus as claimed in claim 3, wherein said amount of change calculation means has a means for calculating said sum in a first direction of said object and said sum in a second direction of said object, and wherein said inclination calculation means detects said inclination of said object based on said amounts of change of said image data in said first and second directions.

18. An image processing apparatus as claimed in claim 17, wherein said inclination calculation means detects said inclination of said object based on an amount of modification for said image data obtained by said modification means when said sum calculated in at least one of said first and second directions satisfies a first condition and an amount of modification for said image data obtained by said modification means when said sum calculated in at least the other of said first and second directions satisfies a second condition.

19. An image processing apparatus as claimed in claim 17, wherein said first direction is substantially perpendicular to said second direction.

20. An image processing apparatus as claimed in claim 19, wherein said first condition is that one of said two amounts of change of said image data achieves a minimum, and wherein said second condition is that the other of said two amounts of change of said image data achieves a maximum.

21. An image processing apparatus as claimed in claim 19, wherein said amount of change calculation means further has a means for calculating said sum in a central direction of said two directions, and wherein said first condition is that a difference between said two amounts of change of said image data achieves a minimum, and wherein said second condition is that said sum calculated in said central direction achieves a maximum.

22. An image processing apparatus as claimed in claim 19, wherein said amount of change calculation means further has a means for calculating said sum in a central direction of said two directions, and wherein said first condition is that said sum calculated in at least one of said two directions achieves a local minimum, and wherein said second condition is that said sum calculated in said central direction achieves a minimum.

23. An image processing apparatus as claimed in claim 17, wherein said amount of change calculation means detects said inclination of said object based on said amount of modification of said image data when said sum calculated in said first direction becomes substantially equal to said sum calculated in said second direction.

24. An image processing apparatus as claimed in claim 23, wherein said amount of change calculation means further has a means for calculating said sum in a central direction of said two directions, and wherein said inclination calculation means has a means for detecting said inclination of said object based on an inclination of said object at which said sum in said first direction becomes substantially equal to said sum in said second direction and an inclination of said object at which said sum in said central direction achieves a maximum.

25. An image processing apparatus as claimed in claim 17, wherein said amount of change calculation means further has:

a two-direction wavelet transform means which wavelet-transforms said image data in said first and second directions;

a high-frequency component energy calculation means which calculates an energy of a high frequency component of said image data contained in said image data wavelet-transformed in said first direction by said two-direction wavelet transform means and an energy of a high frequency component of said image data contained in said image data wavelet-transformed in said second direction by said two-direction wavelet transform means; and an amount of change output means which outputs said two energies as values that represent said sum calculated in said first direction and said sum calculated in said second direction.

26. An image processing method for detecting an inclination of an object, comprising:

reading said object for outputting image data;

calculating a sum of change amounts in said image data in one direction; and calculating an inclination of said object based on said sum, wherein calculating said sum calculates said sums in a first direction of said object and in a second direction that is perpendicular to said first direction; and said calculating said inclination calculates said inclination using a ratio between said sums calculated in said first and second directions.

27. An image processing method as claimed in claim 26, wherein:

said calculating said sum includes calculating differences between pixel values of a plurality of pixels in said one direction at a plurality of locations in said image data, and summing up said differences between said pixel values of said plurality of pixels to calculate said sum in said one direction; and said calculating said inclination calculates said inclination substantially based on:

$R' = E_{LH}/(E_{HL} + E_{LH})$, $\theta = \arctan((4-4R')/(3-2R'))$, $0° \leq \theta \leq 45°$, and $\theta = \arctan((2R'+1)/4R')$, $45° \leq \theta \leq 90°$, where a number of pixels of said image data, sum between two pixels of said image data, said sum calculated in said first direction, and said sum calculated in said second direction are represented by N, I, $E_{HL}$ and $E_{LH}$, respectively.

28. An image processing method for detecting an inclination of an object, comprising:

reading said object for outputting image data;

calculating a sum of change amounts in said image data in one direction; and calculating an inclination of said object based on said sum, wherein said calculating said inclination includes modifying said image data to create a modified image that corresponds to said image data when said object is rotated; and repeating calculating said sum while repeating modifying said image; and said calculating said inclination calculates said inclination of said object based on an amount of modification of said modified image data at which said sum satisfies a prescribed condition.

29. An image processing method as claimed in claim 28, wherein said modified image is a rotated image of said image data.

30. An image processing method as claimed in claim 28, wherein said modified image is an image obtained by reducing said image data in at least said one direction.

31. An image processing method as claimed in claim 28, wherein said calculating said inclination includes detecting said inclination of said object based on said amount of modification of said image data at which said sum is maximized.

32. An image processing method as claimed in claim 28, wherein said calculating said inclination includes detecting said inclination of said object based on said amount of modification of said image data at which said sum is minimized.

33. An image processing method as claimed in claim 28, wherein said calculating said sum includes:

wavelet transforming said image data;

calculating an energy of a high frequency component of said image data contained in wavelet-transformed image data; and outputting said energy as a value that represents said sum.

34. An image processing method as claimed in claim 28, wherein said calculating said sum includes:

firstly wavelet-transforming said image data in a first direction of said object;

secondly wavelet-transforming in a second direction distinct from said first direction an image element that represents a high frequency component of said image data wavelet-transformed by said first transforming;

calculating an energy of a high frequency component of said image data wavelet-transformed by said second transforming; and outputting said energy as a value that represents said sum calculated in a central direction of said two directions.

35. An image processing method as claimed in claim 28, wherein said calculating said inclination includes:

obtaining a plurality of amounts of modification for said image data when said sum satisfies a prescribed condition; and interpolating said plurality of amounts of modification for said image data to obtain an interpolated value and calculating said inclination of said object based on said interpolated value.

36. An image processing method as claimed in claim 35, wherein said interpolating includes calculating said inclination of said object based on said plurality of amounts of modification and said sum associated with each of said plurality of amounts of modification.

37. An image processing method as claimed in claim 28, wherein said calculating said sum includes:

shifting said image data by one bit in a direction in which said image data is to be wavelet-transformed;

firstly wavelet transforming said image data before said image data is shifted by one bit;

secondly wavelet transforming said image data after said image data is shifted by one bit;

calculating an energy of a high frequency component of said image data wavelet-transformed by said first and second wavelet transforming; and outputting said energy as a value that represents said sum.

38. An image processing method as claimed in claim 33, wherein said wavelet transforming is a Haar wavelet transforming.

39. An image processing method as claimed in claim 33, wherein said wavelet transform performed by said wavelet transforming is an overlapped sampling wavelet transform which detects all amounts of change of said image data in a direction in which said wavelet transform is applied.

40. An image processing method as claimed in claim 28, further comprising removing a noise from said image data.

41. An image processing method as claimed in claim 28, further comprising pre-reducing said image data by ½.

42. An image processing method as claimed in claim 28, wherein:

said calculating said sum calculates said sum in first and second directions of said object; and said calculating said inclination includes detecting said inclination of said object based on said amounts of change of said image data in said first and second directions.

* * * * *